(12) United States Patent
Kumami et al.

(10) Patent No.: US 12,548,378 B2
(45) Date of Patent: Feb. 10, 2026

(54) RUN RECORDING DEVICE, RUN RECORDING SYSTEM, AND RUN RECORDING METHOD

(71) Applicant: ASICS CORPORATION, Kobe (JP)

(72) Inventors: Hajime Kumami, Kobe (JP); Koji Saito, Kobe (JP); Takehiro Tagawa, Kobe (JP); Yasuhiro Nomura, Kobe (JP); Nao Hirakawa, Kobe (JP)

(73) Assignee: ASICS CORPORATION, Kobe (JP)

( * ) Notice: Subject to any disclaimer, the term of this patent is extended or adjusted under 35 U.S.C. 154(b) by 304 days.

(21) Appl. No.: 18/252,947

(22) PCT Filed: Nov. 17, 2020

(86) PCT No.: PCT/JP2020/042826
§ 371 (c)(1),
(2) Date: May 15, 2023

(87) PCT Pub. No.: WO2022/107213
PCT Pub. Date: May 27, 2022

(65) Prior Publication Data
US 2024/0013580 A1    Jan. 11, 2024

(51) Int. Cl.
*G07C 1/24*     (2006.01)
*A63B 24/00*    (2006.01)

(52) U.S. Cl.
CPC ............ *G07C 1/24* (2013.01); *A63B 24/0021* (2013.01); *A63B 24/0062* (2013.01); *A63B 2024/0025* (2013.01); *A63B 2024/0068* (2013.01)

(58) Field of Classification Search
None
See application file for complete search history.

(56) References Cited

U.S. PATENT DOCUMENTS 5,800,314 A  * 9/1998  Sakakibara ............ A63B 22/02
                                                                  482/3
2006/0020421 A1* 1/2006  Darley ................. A61B 5/4866
                                                                  702/182

(Continued)

FOREIGN PATENT DOCUMENTS

CN        108565002 A      9/2018
GB          2465162 A      5/2010
(Continued)

OTHER PUBLICATIONS

The extended European search report issued by the European Patent Office on Oct. 5, 2023, which corresponds to European Patent Application No. 20962377.6-1218 and is related to U.S. Appl. No. 18/252,947.

(Continued)

*Primary Examiner* — Paul A D'Agostino
(74) *Attorney, Agent, or Firm* — Studebaker Brackett PLLC

(57) ABSTRACT

A position acquirer acquires position information of a runner running with a certain time set to the starting point of a running time. An environment acquirer acquires environment information indicating running environment of the runner. An information storage unit stores acquired position information together with information on the acquisition date and time. An adjustment unit adjusts, based on the environment information, a running time or distance calculated with the position information such as to correct a difference in the running load due to running environment that may occur between the runner and another runner running with the same certain time set to the starting point of a running time. An output unit displays a result of comparison between the adjusted running time or distance and adjusted running time or distance of another runner (Continued)

running with the same certain time set to the starting point of a running time.

12 Claims, 11 Drawing Sheets

(56) References Cited

U.S. PATENT DOCUMENTS

| | | | | |
|---|---|---|---|---|
| 2008/0096726 A1* | 4/2008 | Riley | A63B 24/0087 | |
| | | | 482/8 | |
| 2011/0003665 A1* | 1/2011 | Burton | G06F 13/4282 | |
| | | | 482/8 | |
| 2013/0165195 A1* | 6/2013 | Watterson | A63B 24/0084 | |
| | | | 463/6 | |
| 2014/0094232 A1* | 4/2014 | Framel | H04W 4/21 | |
| | | | 463/6 | |
| 2014/0125493 A1* | 5/2014 | Utter, II | G16H 20/30 | |
| | | | 340/870.02 | |
| 2014/0129008 A1* | 5/2014 | Utter, II | G16H 20/30 | |
| | | | 700/92 | |
| 2014/0288680 A1* | 9/2014 | Hoffman | G16H 20/30 | |
| | | | 700/91 | |
| 2015/0120186 A1* | 4/2015 | Heikes | G01S 19/40 | |
| | | | 701/468 | |
| 2015/0181314 A1* | 6/2015 | Swanson | G01C 21/20 | |
| | | | 340/870.07 | |
| 2016/0107066 A1* | 4/2016 | Lee | G06Q 30/02 | |
| | | | 482/3 | |
| 2016/0270717 A1* | 9/2016 | Luna | A61B 5/743 | |
| 2017/0043213 A1* | 2/2017 | Daumer | G06V 40/25 | |
| 2017/0046108 A1* | 2/2017 | Kang | G06F 3/0481 | |
| 2018/0043212 A1* | 2/2018 | Shirai | A63B 24/0062 | |
| 2018/0047194 A1* | 2/2018 | Shirai | G16H 50/30 | |
| 2018/0216946 A1* | 8/2018 | Gueye | G01C 21/3617 | |
| 2019/0303807 A1* | 10/2019 | Gueye | G06F 16/9537 | |
| 2020/0074883 A1* | 3/2020 | Radovcic | H04L 67/12 | |
| 2020/0191943 A1* | 6/2020 | Wu | G01S 13/726 | |
| 2020/0327789 A1* | 10/2020 | Huang | G08B 31/00 | |

FOREIGN PATENT DOCUMENTS

| | | |
|---|---|---|
| JP | 2008-299535 A | 12/2008 |
| JP | 2010-206253 A | 9/2010 |
| JP | 2013-215426 A | 10/2013 |

OTHER PUBLICATIONS

International Search Report issued in PCT/JP2020/042826; mailed Feb. 16, 2021.
International Preliminary Report on Patentability (Chapter I) and Written Opinion of the International Searching Authority issued in PCT/JP2020/042826; issued May 16, 2023.
"Notice of Reasons for Refusal" Office Action issued in JP 2022-563280; mailed by the Japanese Patent Office on Oct. 8, 2024.
Motegi et al., "Proposal on the Smart Marathon System using Mobile Phones"; Mar. 16-19, 2010; p. 191; IEICE.
Office Action issued in CN 202080106405.7; mailed by the China National Intellectual Property Administration on Oct. 31, 2025.

* cited by examiner

RUN RECORDING DEVICE, RUN RECORDING SYSTEM, AND RUN RECORDING METHOD

BACKGROUND OF THE INVENTION

1. Field of the Invention

The present invention relates to a run recording device. In particular, the present invention relates to a device that records running states in a marathon race.

2. Description of the Related Art

In recent years, virtual marathon races have been held around the world. There is a known technology that enables each competitor to participate in a race at a different date and time and gathers the race time of each competitor using a communication line such as the Internet, thereby enabling holding of a virtual marathon race (see Patent Literature 1, for example).

Patent Literature

Patent Literature 1: Japanese Unexamined Patent Application Publication No. 2008-299535

SUMMARY OF INVENTION

In a virtual marathon race, however, since each participant participates in a race at a different date and time, such a race is difficult to hold as an event that proceeds simultaneously at different locations and may lack a sense of unity.

The present invention has been made in view of such a situation, and a purpose thereof is to provide a system that enables holding of a fair marathon race with simultaneity maintained.

To solve the problem above, a run recording device according to one aspect of the present invention includes: a position acquirer that acquires position information of a first runner running with a certain time set to the starting point of a running time and also acquires position information of a second runner running with the same time as the certain time set to the starting point of a running time; an environment acquirer that acquires environment information indicating running environment of the first runner and also acquires environment information indicating running environment of the second runner; and an adjustment unit that makes adjustment, based on the environment information, to running information calculated with the position information such as to correct a difference in the running load due to running environment that may occur between the first runner and the second runner running in the same running time starting at the certain time.

Another aspect of the present invention relates to a run recording system. The run recording system includes: a run recording terminal including a position acquirer that acquires position information of a runner running with a certain time set to the starting point of a running time, and an environment acquirer that acquires environment information indicating running environment of the runner; and a run recording server including an adjustment unit that makes adjustment, based on the environment information, to running information calculated with the position information such as to correct a difference in the running load due to running environment that may occur between the runner and another runner running in the same running time starting at the certain time.

Yet another aspect of the present invention relates to a run recording device. The device includes: a position acquirer that acquires position information of a runner running with a certain time set to the starting point of a running time; an environment acquirer that acquires environment information indicating running environment of the runner; an adjustment unit that makes adjustment, based on the environment information, to running information calculated with the position information such as to correct a difference in the running load due to running environment that may occur between the runner and another runner running in the same running time starting at the certain time; and a comparison unit that acquires a result of comparison between running information after the adjustment and adjusted running information of another runner running in the same running time starting at the certain time.

Still yet another aspect of the present invention relates to a run recording method. The method includes: acquiring position information of a first runner running with a certain time set to the starting point of a running time and also acquiring position information of a second runner running with the same time as the certain time set to the starting point of a running time; acquiring environment information indicating running environment of the first runner and also acquiring environment information indicating running environment of the second runner; and making adjustment, based on the environment information, to running information calculated with the position information such as to correct a difference in the running load due to running environment that may occur between the first runner and the second runner running in the same running time starting at the certain time.

Optional combinations of the aforementioned constituting elements, and implementation of the present invention, including the constituting elements and expressions, in the form of methods, apparatuses, programs, transitory or non-transitory storage medium storing programs, or systems may also be practiced as additional modes of the present invention.

DETAILED DESCRIPTION OF THE INVENTION

First Embodiment

In the first embodiment, a marathon race (hereinafter referred to as a "remote marathon race") is held in which the participants race for the time measured for the marathon distance, simultaneously at different locations such as remote locations. In a remote marathon race, a running time is adjusted during the run based on environment information, which indicates the running environment of each participant, and the current rank obtained by comparison with other participants based on the adjusted running time and the running distance is output from moment to moment during the run. In a general marathon race, a gross time, which is the time from when a gun sounds to signal the start of the race to when the runner reaches the finish line, and a net time, which is the time from when the runner crosses the start line to when the runner reaches the finish line, are measured. In a remote marathon race, a gross time, which is the time from the simultaneous start at the same date and time to when the runner reaches the distance of finish, and a net time, which is the running time of each runner from the time of start of measurement to when the runner reaches the distance of finish, are measured. Further, the actual measured running time and the adjusted running time are distinguished from each other to be output. In particular, the adjusted running time is referred to as a remote time. In a remote marathon race, the adjusted running times are compared among the participants to determine the ranking, thereby absorbing differences in physical stress due to environments and providing the participants with fairer results.

Figure 1:
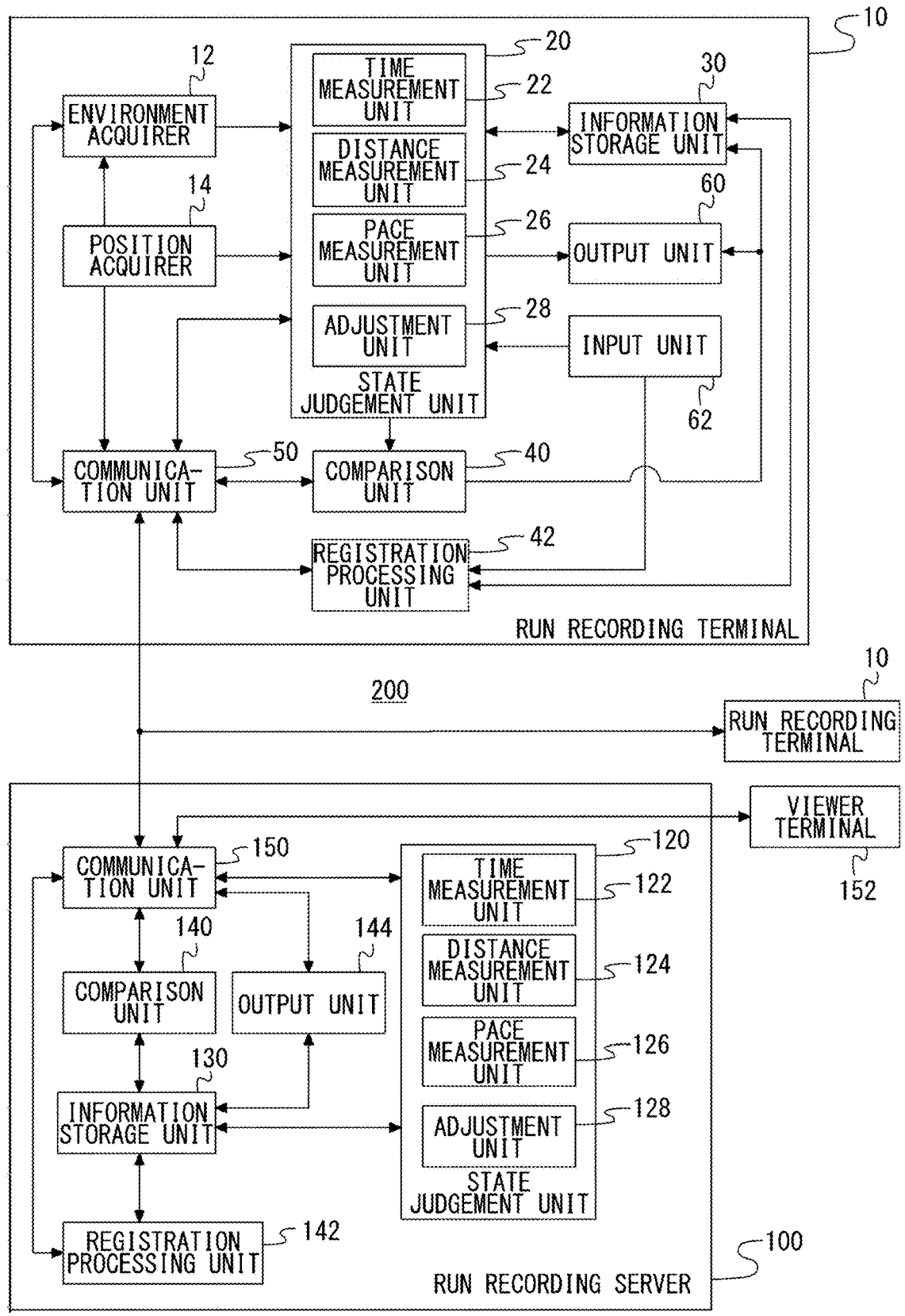
FIG. 1 is a functional block diagram that shows a configuration of a run recording system.

FIG. 1 is a functional block diagram that shows a configuration of a run recording system 200. The run recording system 200 is constituted by multiple run recording terminals 10 and a run recording server 100 connected thereto. Each run recording terminal 10 may be, for example, a mobile terminal, such as a smartphone or smartwatch, carried by a participant of a remote marathon race. Each run recording terminal 10 includes an environment acquirer 12, a position acquirer 14, a state judgement unit 20, an information storage unit 30, a comparison unit 40, a registration processing unit 42, a communication unit 50, an output unit 60, and an input unit 62. Although the configuration of each run recording terminal 10 is realized by the configurations shown in FIG. 2 in terms of hardware components, FIG. 1 shows functional blocks realized by cooperation of such components. Therefore, it will be understood by those skilled in the art that these functional blocks may be implemented in a variety of forms by hardware only, software only, or a combination thereof.

The input unit 62 accepts an instruction provided by a user's operation input. Based on an instruction from the user, the registration processing unit 42 processes the issuance of a user account with a user ID and a password for an unregistered user and also processes the registration for participation in a race. The registration processing unit 42 requests the issuance of the user account to the run recording server 100 via the communication unit 50 and registers the issued user ID and password in the information storage unit 30. Based on an instruction from the user, the registration processing unit 42 requests the registration for participation in a remote marathon race desired by the user to the run recording server 100 via the communication unit 50 and registers, in the information storage unit 30, a race ID indicating the remote marathon race in which participation has been registered.

The position acquirer 14 acquires position information of the current location received from a satellite positioning system, such as the GPS (Global Positioning System), and transmits to the state judgement unit 20 the position information together with information indicating the acquisition date and time. The position information mainly includes date and time information in Coordinated Universal Time, latitude and longitude information, altitude information, moving speed information, and moving direction information, for example. The position acquirer 14 acquires the position information at intervals of several seconds; however, the position acquirer 14 may acquire the position information at regular time intervals or at indefinite intervals, such as each time a peculiar change in motion is detected by a motion sensor, which will be described later.

The environment acquirer 12 acquires environment information of the current location and transmits the environment information to the state judgement unit 20. The environment information is information indicating, for example, the temperature, humidity, wind speed, wind direction, atmospheric pressure, altitude, and road surface condition (a paved road, an unpaved road, an athletic track, or a treadmill). The environment information will be detailed later.

The state judgement unit 20 includes a time measurement unit 22, a distance measurement unit 24, a pace measurement unit 26, and an adjustment unit 28. The time measurement unit 22 measures a running time based on time information from a timer. The time measurement unit 22 acquires, from the run recording server 100, information on the start date and time, which indicates the simultaneous start time of a remote marathon race in which participation has been registered, to measure start delay time from the start date and time to the start of recording of the running time, and the time measurement unit 22 also measures the elapsed time from the time of start of recording. In the recorded running time, a portion from the simultaneous start time of the remote marathon race in which participation has been registered to the time limit of the race is considered valid. The recorded running time is defined as the net time, and the time obtained by adding the start delay time to the net time is defined as the gross time. The time measurement unit 22 measures a lap time, which is moving time for a predetermined distance. The predetermined distance for which the lap time is measured may be 1 kilometer or 1 mile, for example.

The distance measurement unit 24 acquires information on the race distance (such as the total distance of 42.195 km or 26.2 miles as the marathon distance) from the run recording server 100 and calculates the running distance, which is the accumulated value of distance based on the position information from the time of start of recording, and the remaining distance. The distance measurement unit 24 measures the distance between multiple positioning points of which the position information has been acquired and calculates the cumulative running distance obtained by connecting the series of acquired distances. However, since each piece of position information contains an error, the distance measurement unit 24 may correct the distance using various methods, such as statistical analysis using standard deviation or the like to make a line connecting three or more positioning points smoother, analysis using acceleration information from a motion sensor, and removal of abnormal values. The distance measurement unit 24 can acquire the position of a point on the corrected trajectory and use the position as corrected position information. The distance measured by the distance measurement unit 24 is the length of the line connecting the corrected pieces of position information. Each time the running distance measured by the distance measurement unit 24 increases by a predetermined distance, such as 10 m, the passing time at the point of 10 m is calculated. Accordingly, the distance measurement unit 24 identifies two positioning points that sandwich a point among the points set every 10 m (hereinafter also referred to as "time measurement points"), and the time measurement unit 22 estimates the passing time at the time measurement point based on the running time and the distance between the two positioning points. Also, a course with a distance X is divided into K sections of $S_1$, $S_2$, ..., $S_K$ at 1 km intervals.

The pace measurement unit 26 calculates the running pace by dividing the distance between corrected multiple positioning points by time. Besides the moving pace between positioning points, the pace measurement unit 26 further calculates a pace within a predetermined distance. The pace within a predetermined distance may be, for example, an average pace within each of sections set at 1 km intervals, an average pace between the starting point of the current section and the current location, or an average pace from the time of start of recording to the current location. The information of the running time, the running distance, and the pace calculated by the time measurement unit 22, the distance measurement unit 24, and the pace measurement unit 26 is transmitted to the output unit 60. Also, one or both of the position information acquired from the position acquirer 14 and the position information corrected by the distance measurement unit 24 is recorded together with information on the acquisition date and time thereof in the information storage unit 30.

Based on multiple types of environment information acquired by the environment acquirer 12, the adjustment unit 28 adjusts the running time measured by the time measurement unit 22. The time interval between two positioning points is usually a difference in positioning time, and the adjustment unit 28 adjusts the positioning time difference based on the multiple types of environment information. The adjustment unit 28 transmits, to the run recording server 100 via the communication unit 50, information necessary for the adjustment of the running time in the section where the user is currently running, together with an adjustment value determination request. As a response thereto, the adjustment unit 28 receives the adjustment value calculated by the run recording server 100. The adjustment unit 28 adjusts the running time by adding the adjustment value thus received to the running time in the section where the user is currently running. The information transmitted by the adjustment unit 28 to the run recording server 100 may be, for example, information of the running time, running distance, and environment information. As a modification, the adjustment value may be calculated by the adjustment unit 28 instead of the run recording server 100. The adjustment unit 28 acquires, from the run recording server 100, adjustment values $A_1$, $A_2$, ..., $A_K$ for running times $T_1$, $T_2$, ..., $T_K$ in the respective sections $S_1$, $S_2$, ..., $S_K$. When the entire distance X is 42.195 km, each section from $S_1$ to $S_{42}$ is 1 km long, and only the section $S_{43}$ is 0.195 km long. Also, when the user is running in the section $S_{13}$, for example, the running time from the 12 km point to the current location is subject to adjustment, and, until the user passes through the 13 km point, the adjustment value $A_{13}$ is updated each time the running distance in the section increases by 10 m. The current remote time is a time obtained by adding an accumulated adjustment value, which is obtained by accumulating the adjustment values of the respective sections up to the present, to the running time from the simultaneous start time, which is the start date and time common to all the participants, to the current time.

The adjustment value is calculated using a function $f(e(t))$ of a learned model with an environment value $e(t)$ as a parameter. The function $f(e(t))$ may be generated as a learned model by means of regression analysis with the environment value $e(t)$ as the explanatory variable and the adjustment value of the running time as the objective variable, based on past environment information and running data. Also, the environment information and running data accumulated in the run recording system 200 may be further reflected as a learning result in the function $f(e(t))$. The adjustment value may be a positive or negative number and is recorded, in the information storage unit 30, in association with information indicating a section to be adjusted. The adjustment value is calculated in units of time based on the participant's environment information and is adjusted so that participants of the same ability have the same time.

The information storage unit 30 stores the position information acquired by the position acquirer 14 together with information on the acquisition date and time thereof and also stores the position information corrected by the distance measurement unit 24 together with information on the acquisition date and time thereof. The information storage unit 30 also stores information on the adjustment value acquired by the adjustment unit 28, in association with information indicating a section to be adjusted. The information storage unit 30 further stores information of the user ID, the password, and a race ID of the user, for example.

The comparison unit 40 transmits, to the run recording server 100 via the communication unit 50, information necessary for determination of ranking together with a ranking determination request, each time the running distance in the section where the user is currently running increases by 10 m. In response thereto, the comparison unit 40 receives, as a comparison result, ranking information indicating the current rank determined by the run recording server 100. The information transmitted by the comparison unit 40 to the run recording server 100 may be, for example, the running distance and the remote time at the point or may be the position information, the information on the acquisition date and time, and the running time and the adjustment value in each distance section. The ranking information is a result of comparison with other participants whose running times start at the simultaneous start time, which is the start date and time common to all the participants registered for the race with the same race ID. More specifically, the ranking information is a value indicating the current rank determined by comparing the running time (the remote time obtained by adding the accumulated value of the adjustment values to the gross time) with the running times of other participants at the same time measurement point or in the same distance section, or a value indicating percentage from the top within which the current rank is included, in the ranking among all the participants. The comparison unit 40 acquires, as the current rank, the rank at a point that the user has passed through most recently among the points set every 10 m or the points set every 1 km. For example, when the user is running in the section $S_{13}$, the comparison unit 40 acquires the ranking information at a point that the user has passed through most recently among the time measurement points set every 10 m or the ranking information at the 12 km point and transmits the ranking information to the output unit 60. Also, at intervals even shorter than the above intervals, e.g., at predetermined time intervals such as every 1 second or at predetermined distance intervals such as every 1 m, the comparison unit 40 may transmit, to the run recording server 100, information of the current running distance, estimated passing time at the distance point, and the adjustment value together with the ranking determination request and may acquire the real-time order in the section where the user is currently running.

In a modification, a run recording terminal 10 may be configured to transmit, to the run recording server 100, the adjustment value determination request and the ranking determination request together as a single determination request to acquire the adjustment value and the ranking information. In this case, when the run recording terminal transmits to the run recording server 100 the running distance, running time, and environment information together with the determination request, the run recording server 100 determines the adjustment value of the running time and the ranking information and transmits the adjustment value or the remote time and the ranking information to the run recording terminal 10.

The output unit 60 outputs running states based on the adjusted running time or the running distance. The output unit 60 outputs the running states, such as the gross time, the adjusted running time (remote time), the running distance, and the current rank, in the form of an audio reading of such information. The output unit 60 also displays the running states such as the gross time, remote time, running distance, and current rank on the screen of the user's mobile terminal.

The run recording server 100 includes a state judgement unit 120, an information storage unit 130, a comparison unit 140, a registration processing unit 142, and a communication unit 150. Although the configuration of the run recording server 100 is also realized by configurations including a CPU/GPU, a RAM, a ROM, and a communication module in terms of hardware components, FIG. 1 shows functional blocks realized by cooperation of such components. Therefore, it will be understood by those skilled in the art that these functional blocks may be implemented in a variety of forms by hardware only, software only, or a combination thereof.

The communication unit 150 is connected to the communication unit 50 of each of multiple run recording terminals 10 via the Internet and receives information of each user, such as the user ID, password, race ID, position information, acquisition date and time, running distance, running time, environment information, adjustment value determination request, remote time, and ranking determination request. The registration processing unit 142 registers a user ID and a password in the information storage unit 130 in response to a request for issuance of a user account from a run recording terminal 10. The registration processing unit 142 also registers, in response to a request for participation in a remote marathon race from a run recording terminal 10, the user ID of the participant in association with the race ID of the race in which the participant is to participate, in the information storage unit 130. The information storage unit 130 further stores information of each user received from the corresponding run recording terminal 10, such as the position information, acquisition date and time, running distance, running time, environment information, remote time, and start delay time.

The state judgement unit 120 includes a time measurement unit 122, a distance measurement unit 124, a pace measurement unit 126, and an adjustment unit 128, which correspond respectively to the time measurement unit 22, distance measurement unit 24, pace measurement unit 26, and adjustment unit 28 of a run recording terminal 10. The time measurement unit 122 acquires, from each of multiple run recording terminals 10, a running time of the runner as the user. In a modification, the time measurement unit 122 may acquire the position information and information on the acquisition date and time thereof from a run recording terminal 10 to calculate, as the gross time, the difference between the simultaneous start time and the passing time in the section where the runner is currently running and may also calculate, as the net time, the difference between the acquisition date and time of the position information received first and the acquisition date and time of the latest position information. The distance measurement unit 124 acquires, from each of multiple run recording terminals 10, a running distance of the runner as the user. In a modification, the distance measurement unit 124 may acquire the position information and information on the acquisition date and time thereof from a run recording terminal 10 to calculate the accumulated value of distance from the position information received first to the latest position information, as the current running distance. The pace measurement unit 126 acquires, from each of multiple run recording terminals 10, a pace within a predetermined distance, such as an average pace within each of sections set at 10 minute intervals, an average pace from the starting point of the current section, or an average pace from the time of start of recording to the current time, of the runner as the user. In a modification, the pace measurement unit 126 may acquire the position information and information on the acquisition date and time thereof from a run recording terminal 10 to calculate the pace within a predetermined distance.

The adjustment unit 128 receives, from each of multiple run recording terminals 10, the running time and the environment information of the runner as the user in the section where the runner is currently running, together with the adjustment value determination request. Based on the environment information, the adjustment unit 128 calculates the adjustment value of the running time and transmits, to the run recording terminal 10, the calculated adjustment value as a response to the adjustment value determination request. The adjustment unit 128 calculates the remote time by adding the accumulated adjustment value obtained by accumulating the adjustment values of the respective sections up to the present, to the running time from the simultaneous start time to the current time and stores, in the information storage unit 130, the remote time in association with the user ID and the running distance.

The comparison unit 140 corresponds to the comparison unit 40 in a run recording terminal 10 and receives, from each of multiple run recording terminals 10, the running distance and the remote time at the point together with the ranking determination request. In response to the ranking determination request, the comparison unit 140 compares the received remote time at the point of the running distance with the remote times at the same point of other participants registered to participate in the race with the same race ID. In other words, the comparison unit 140 compares the remote times at the same point among the runners whose running times start at the simultaneous start time common to all the participants registered for the race with the same race ID. As a result of the comparison, the comparison unit 140 determines the user's rank and transmits the rank to the run recording terminal 10. The comparison unit 140 determines a runner's rank by comparison with remote times at the same distance point, among the records of valid remote times, i.e., remote times included in the range from the simultaneous start time to the time limit, of other participants registered to participate in the race with the same race ID, stored in the information storage unit 130.

If a list of all participants arranged in order of shortest running time is generated using a conventional method without adjusting the running times, a participant who has finished running a 1 km section later will basically not be added at a rank higher than a participant who has finished running the 1 km section earlier. In the present embodiment, however, as a result of running time adjustment, a participant who has finished running the section later may be added at a rank higher than a participant who has finished running the section earlier; accordingly, the ranking information transmitted from the comparison unit 140 to each run recording terminal 10 is merely provisional ranking, which may be changed later.

In order to allow viewers other than the participants to view information, such as the running distance, running time, remote time, and rank of each participant, an output unit 144 transmits information on each participant to a viewer terminal 152 via the communication unit 50 in response to a viewing request. The information on each participant includes information for identifying the participant and a list of the running distance, running time and remote time, adjustment value, and rank in each section of the participant, for example.

The first embodiment describes an example in which the measurement of the running time and running distance and the correction of the position information are performed on the side of the state judgement unit 20 in a run recording terminal 10. In a modification, part or all of the processes performed by the state judgement unit 20 may be performed on the side of the state judgement unit 120 in the run recording server 100, and the result may be sent back to the run recording terminal 10. In this case, the run recording terminal 10 transmits the position information and information on the acquisition date and time thereof to the run recording server 100 via the communication unit 50, and the state judgement unit 120 receives such information via the communication unit 150. The time measurement unit 122 and the distance measurement unit 124 then calculate the running time and the running distance and transmit the running time and running distance to the run recording terminal 10 via the communication unit 150. In another modification, the adjustment value of the running time may be calculated on the run recording terminal 10 side, and the adjustment value or remote time information may be transmitted from the run recording terminal 10 to the run recording server 100. Also, in yet another modification, one of the multiple run recording terminals 10 may also be equipped with the configuration of the run recording server 100 as host functions, so that remote marathon races may be substantially realized only with the multiple run recording terminals 10.

Figure 2:
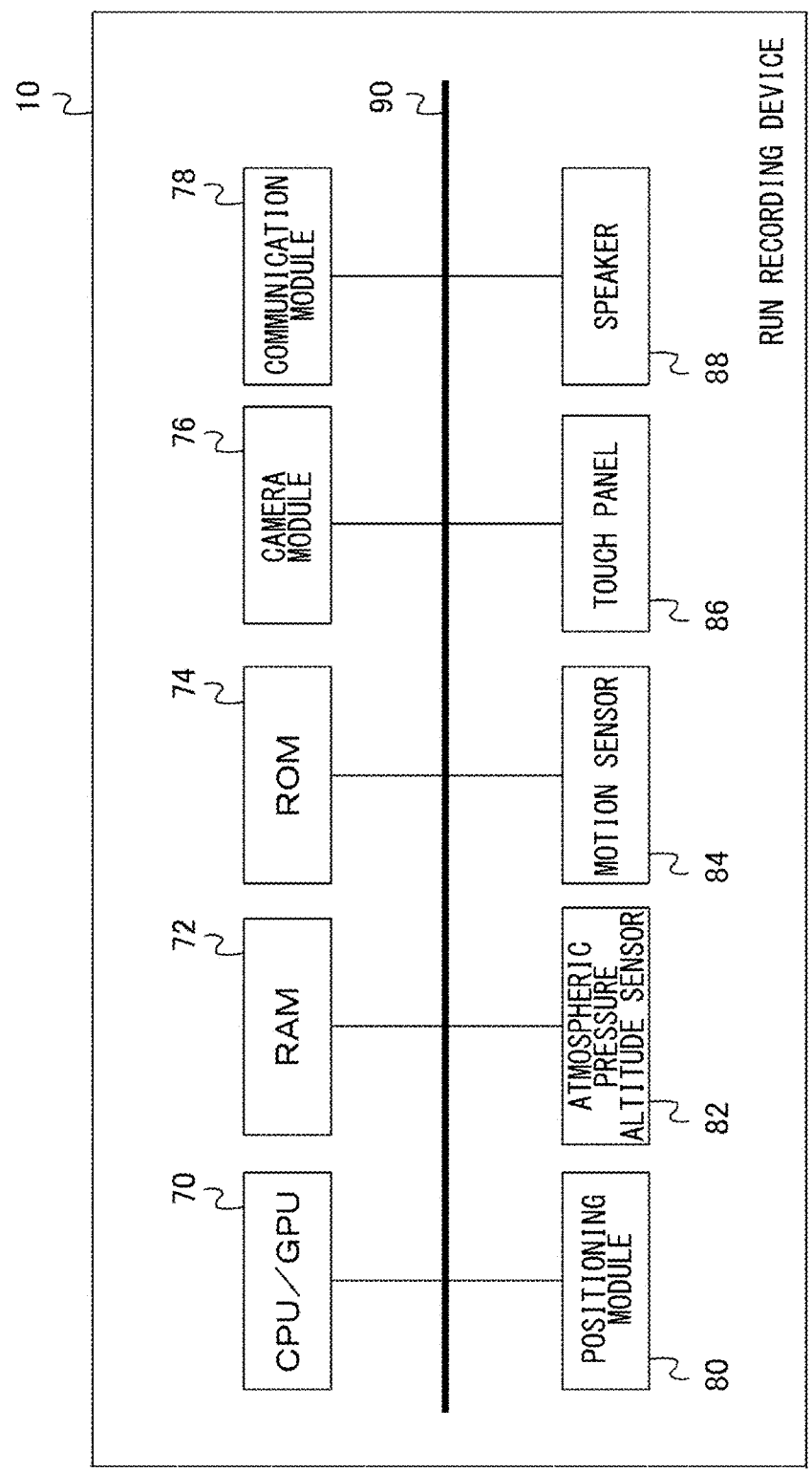
FIG. 2 is a diagram that shows a hardware configuration of a run recording terminal.

FIG. 2 shows a hardware configuration of a run recording terminal 10. Each run recording terminal 10 includes a CPU/GPU 70, a RAM 72, a ROM 74, a camera module 76, a communication module 78, a positioning module 80, an atmospheric pressure altitude sensor 82, a motion sensor 84, a touch panel 86, and a speaker 88, which are connected to one another via a bus 90. Each run recording terminal 10 is implemented in the form of a mobile terminal, such as a smartphone. As a modification, each run recording terminal may be implemented in the form of a watch-type or glasses-type information terminal to be worn on the body, such as a smartwatch, a GPS watch, or smart glasses, or may be implemented in the form of a small information terminal to be built into a running shoe, such as a smart shoe. When a run recording terminal 10 is implemented in the form of a glasses-type information terminal, the running states such as the running time, running distance, adjustment value, and rank may be displayed on a screen visually recognized by the wearer, and, in addition, using an AR (augmented reality) or MR (mixed reality) imaging technique, the image of another runner ahead of the wearer may be projected in the field of view.

The CPU/GPU 70 is a processor unit that executes a program to perform each function of the run recording terminal 10. The RAM 72 is a memory area used as a workspace for each program. The ROM 74 is a non-volatile memory in which each program and data are stored. The CPU/GPU 70, RAM 72, and ROM 74 may be configured in the form of a SoC (System on a Chip) in which they are all included. The camera module 76 is a camera that captures still images and moving images. The communication module 78 is a communication interface for cellular phone communication, wireless LAN, and short-range wireless communication, for example, and functionally corresponds mainly to the communication unit 50. The positioning module 80 is a module that acquires position information from a satellite positioning system, such as the GPS, and functionally corresponds mainly to the position acquirer 14. The atmospheric pressure altitude sensor 82 is a sensor that detects the atmospheric pressure at the current time and estimates the altitude based on the atmospheric pressure and functionally corresponds mainly to the environment acquirer 12. The motion sensor 84 includes an acceleration sensor, an angular velocity sensor, and a geomagnetic sensor for detecting the moving direction and the moving speed and functionally corresponds mainly to the environment acquirer 12. The touch panel 86 accepts user touch input and displays text and images on the screen, and the touch panel 86 functionally corresponds mainly to the output unit 60 and the input unit 62. The speaker 88 outputs sound and functionally corresponds mainly to the output unit 60.

When the run recording terminal 10 has a temperature sensor and a humidity sensor built therein, the environment acquirer 12 may acquire temperature information, humidity information, weather information, wind speed information, wind direction information, and the like from those sensors. The environment acquirer 12 may also acquire the temperature information, humidity information, weather information, wind speed information, wind direction information, and the like associated with the current position information from a certain server that publishes meteorological information, via the communication unit 50. The environment acquirer 12 also acquires atmospheric pressure information from the atmospheric pressure altitude sensor 82. Also, the environment acquirer 12 may acquire altitude information from the atmospheric pressure altitude sensor 82 or may acquire altitude information based on the position information acquired from the positioning module 80 and map information acquired via the communication unit 50. The environment acquirer 12 also calculates the degree of increase or decrease of altitude based on the difference between the altitude information of the current location and the altitude information of the previous positioning point.

Based on the altitude information and the distance information measured by the distance measurement unit 24 or based on information on the moving direction acquired by the motion sensor 84, the environment acquirer 12 also calculates the inclination angle of the road surface. Also, the environment acquirer 12 may judge whether the road surface condition is a paved road, an unpaved road, an athletic track, or a treadmill, based on the selection input by the user via the touch panel 86 before the start of recording or may judge the road surface condition of the current location based on the position information acquired from the positioning module 80 and the map information acquired via the communication unit 50.

It is conceivable to pause the log measurement during a wait at the traffic light or a break. However, just as there is no idea of pausing the measurement in a general marathon race, if a participant can freely pause and restart after a break, fairness cannot be maintained with other participants. Therefore, the pause button may not be provided, and, if the measurement is stopped accidentally due to a malfunction or an operational error in the information terminal, processing for counting the participant as dropping out or processing for terminating the recording may be performed.

Figure 3:
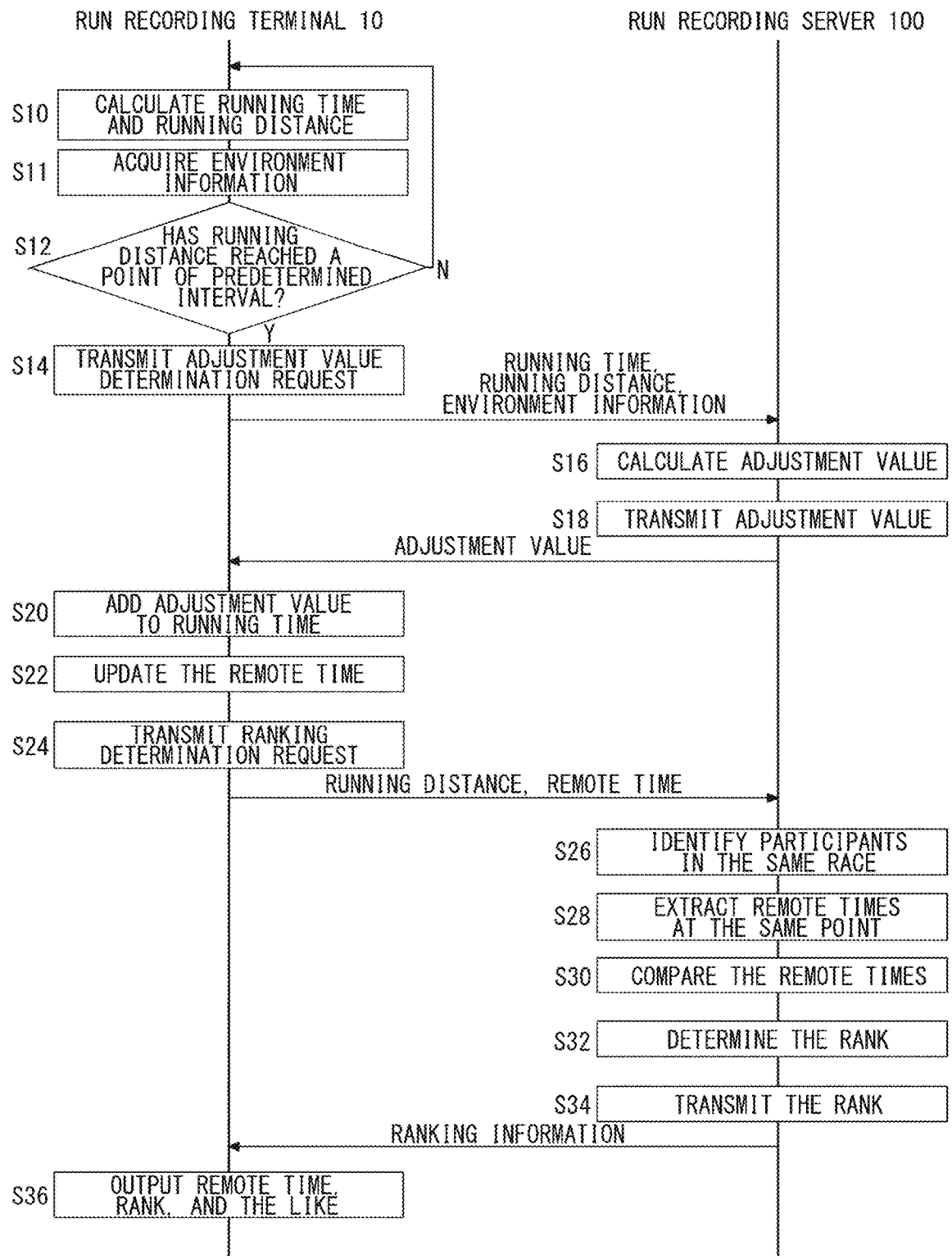
FIG. 3 is a flowchart that shows a process of transmitting and receiving information performed between a run recording terminal and a run recording server, adjusting a running time, and determining ranking.

FIG. 3 is a flowchart that shows a process of transmitting and receiving information performed between a run recording terminal 10 and the run recording server 100, adjusting the running time, and determining the ranking. In a run recording terminal 10 of a user who is running a remote marathon race, the time measurement unit 22 and the distance measurement unit 24 calculate the running time and the running distance based on the position information and the acquisition time thereof (S10), the environment acquirer 12 acquires the environment information (S11), and the process of S10 and S11 is repeated until the running distance reaches one of points set at predetermined intervals, such as every 10 m (N at S12). When the running distance reaches one of points set every 10 m (Y at S12), the run recording terminal 10 transmits, to the run recording server 100, the running time, running distance, and environment information, as the adjustment value determination request (S14). In the run recording server 100 that has received the adjustment value determination request, the adjustment unit 128 calculates the adjustment value of the running time based on the received running time, running distance, and environment information (S16) and transmits, to the run recording terminal 10, the calculated adjustment value as a response to the adjustment value determination request (S18). In the run recording terminal 10 that has received the adjustment value, the adjustment unit 28 adds the received adjustment value to the running time (S20) and updates the remote time (S22).

The comparison unit 40 of the run recording terminal 10 transmits the running distance and the remote time as the ranking determination request to the run recording server 100 (S24); in the run recording server 100 that has received the ranking determination request, the comparison unit 140 identifies other participants registered for the race with the same race ID in the information storage unit 130 (S26). The comparison unit 140 extracts, from the data of the identified other participants, remote times at the same point as indicated in the ranking determination request (S28) and compares the remote time indicated in the ranking determination request and the remote times of other participants (S30) to determine the rank of the user, who is the sender of the ranking determination request (S32). The comparison unit 140 then transmits, to the run recording terminal 10, the ranking information as a response to the ranking determination request (S34). The run recording terminal 10 that has received the ranking information outputs the running distance, remote time, rank, and the like in the form of screen display or sound, for example (S36). The process flow described above is repeated until the termination of the recording.

Figure 4:
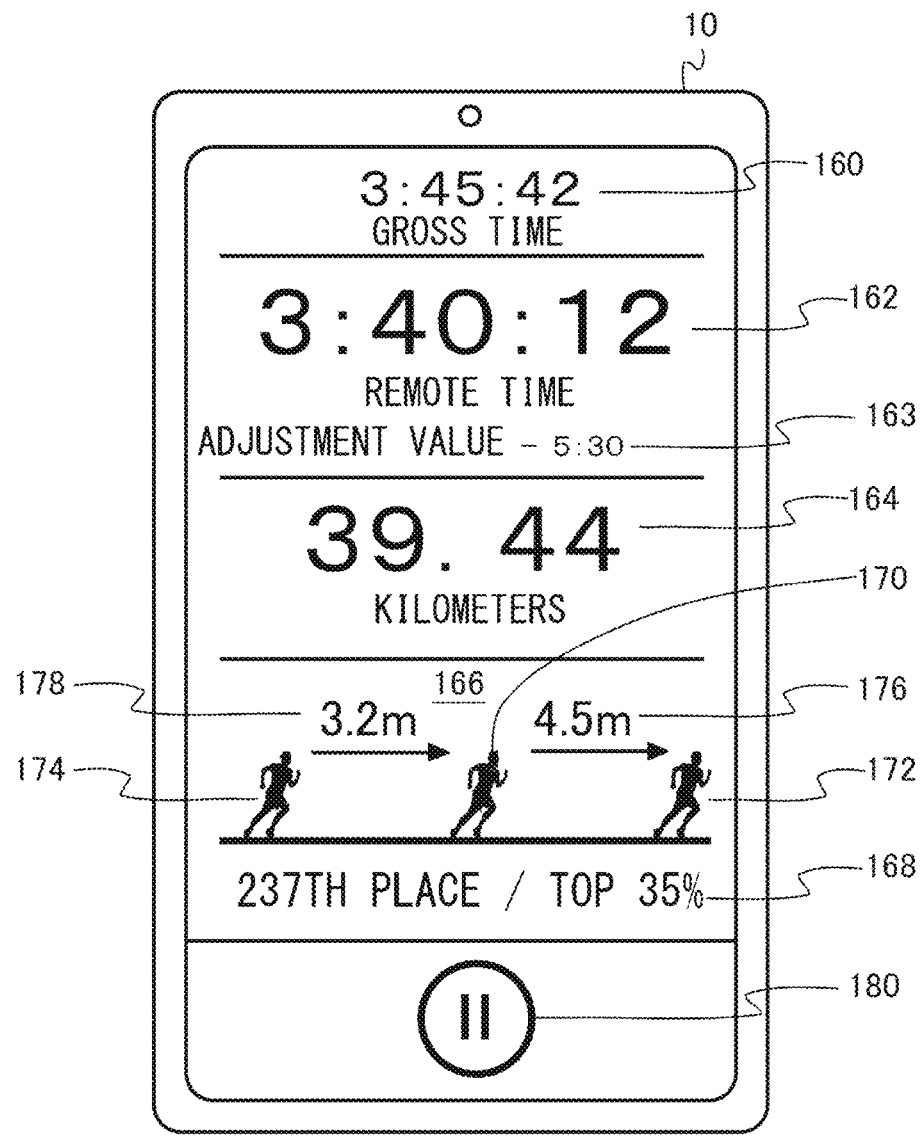
FIG. 4 is a diagram that shows an example of screen display on a user's mobile terminal.

FIG. 4 shows an example of screen display on a user's mobile terminal. A running time 160 shows the running time (gross time) as an actual measured value. A remote time 162 shows the running time after adjustment (remote time). An adjustment value 163 shows the accumulated value of the adjustment values to be added to the gross time. A running distance 164 shows the running distance. A situation image 166 shows an animation displaying the positional relationship between the user himself or herself and the preceding and following runners. In the situation image 166, a self icon 170 represents the user himself or herself and is always displayed in the center. With the running direction set toward the right side of the screen, a preceding runner icon 172, which indicates the position of the preceding runner, is displayed on the right side, and a following runner icon 174, which indicates the position of the following runner, is displayed on the left side, at the positions corresponding to the respective distance differences from the user. A preceding distance 176 shows, with text, the distance difference from the preceding runner. Also, a following distance 178 shows with text the distance difference from the following runner. In a modification, the intervals from the preceding runner and the following runner may be shown as time differences. Rank display 168 shows, with text, the user's current rank and the percentage from the top within which the user is positioned. A stop button 180 is a button used to order the stop of recording.

The rank displayed in the rank display 168 and the distance differences from the preceding runner and the following runner displayed with the icons are those in the section that the user has passed through most recently. In a modification, the remote time at the current point, which is obtained by adding, to the remote time up to the section that the user has passed through most recently, the running time from the passing through of the section to the current position and the adjustment value thereof, may be compared with the remote times of other participants at the same point among the distance points set every 10 m, and the rank obtained thereby may be displayed.

Figure 5:
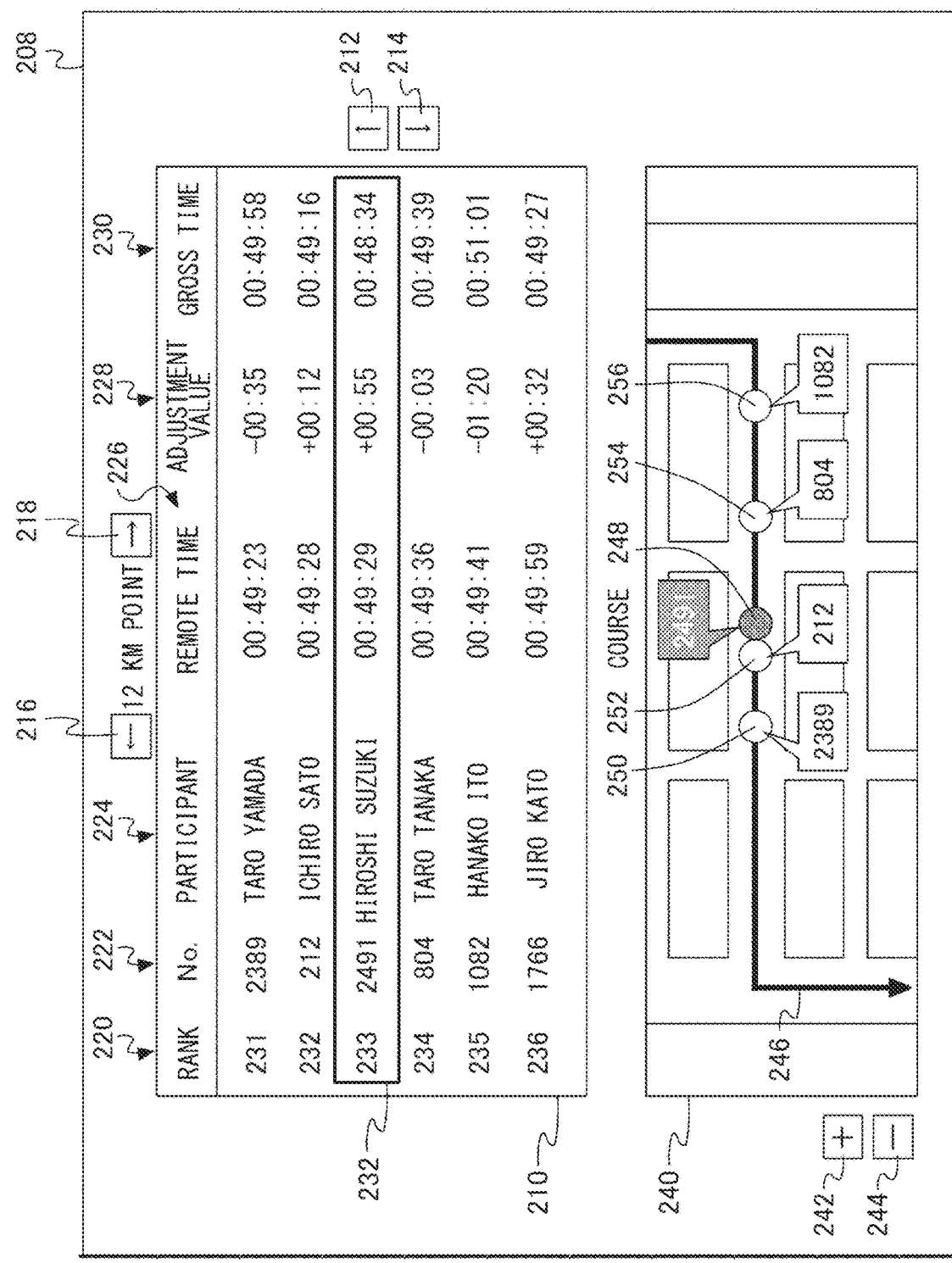
FIG. 5 is a diagram that shows an example of screen display displaying the rank of each participant in a remote marathon race in a first embodiment.

FIG. 5 shows an example of screen display displaying the rank of each participant in a remote marathon race in the first embodiment. A screen 208 is a screen of the viewer terminal 152 prepared mainly for viewing by persons other than the participants and is displayed, for example, on a personal computer or tablet terminal using a web browser. The screen 208 includes a ranking table 210 and a map column 240. The ranking table 210 shows a list of participants in the remote marathon race in order of shortest remote time at a predetermined point. A first column 220 shows the rank of each participant, a second column 222 shows the number of each participant, and a third column 224 shows the name of each participant. Also, a fourth column 226 shows the remote time of each participant, a fifth column 228 shows the adjustment value of each participant, and a sixth column 230 shows the gross time of each participant. In the example of FIG. 5, seven participants are displayed, from the "231st" to "236th" places in the ranking based on the remote time at the "12 km point". To the right of the ranking table 210, an upward scroll button 212 and a downward scroll button 214 are displayed; when a viewer presses the upward scroll button 212, the list is switched to a list of higher-ranked participants, and, when a viewer presses the downward scroll button 214, the list is switched to a list of lower-ranked participants. Above the ranking table 210, a left move button 216 and a right move button 218 are displayed; when a viewer presses the left move button 216, the list display is switched to that of the "11 km point" as the previous distance point, and, when a viewer presses the right move button 218, the list display is switched to that of the "13 km point" as the next distance point.

For example, for a participant named "Hiroshi Suzuki", whose rank is "233rd" place and whose number is "2491", the time "00:49:29" is displayed as the remote time at the 12 km point. This remote time is a running time obtained by adding the adjustment value of "00:55" to the gross time of "00:48:34". Similarly, also for the participant named "Ichiro Sato", whose rank is "232nd" place and whose number is "212", and the participant named "Jiro Kato", whose rank is "236th" place and whose number is "1766", a positive adjustment value is added to each of their gross times. This means that, since these participants ran in relatively comfortable environments, positive adjustment values are added so that their running times are adjusted to be longer by that much. On the other hand, for the participant named "Taro Yamada", whose rank is "231st" place and whose number is "2389", the participant named "Taro Tanaka", whose rank is "234th" place and whose number is "804", and the participant named "Hanako Ito", whose rank is "235th" place and whose number is "1082", a negative adjustment value is added to each of their gross times. This means that, since these participants ran in relatively uncomfortable environments, negative adjustment values are added so that their running times are adjusted to be shorter by that much. Thus, by adjusting, with the adjustment value, the difference in the running environment for each of participants who are running with the same simultaneous start time set to the starting point in the same race, the fairness of the ranking can be improved. When a viewer has selected a participant from the list of participants, the row of the selected participant is enclosed by a bold selection frame 232 and highlighted. Also, the current positions of the selected participant and the preceding and following participants are displayed in the map column 240.

The map column 240 shows a map of a marathon course virtually set. To the left of the map column 240, an enlarge button 242 and a reduce button 244 are displayed. When the enlarge button 242 is pressed, the map displayed in the map column 240 is enlarged, and, when the reduce button 244 is pressed, the map displayed in the map column 240 is reduced. A course line 246 indicates the marathon course set on the displayed map. A selected participant mark 248, which indicates the participant with the number "2491" selectively displayed with the selection frame 232, is displayed at a predetermined position on the course line 246 such as to be positioned approximately near the center of the map column 240. Ahead of the selected participant mark 248 on the course line 246, a first participant mark 250 and a second participant mark 252, which respectively indicate the participants with the numbers "2389" and "212" whose latest ranks are higher, are displayed at the corresponding positions. Also, behind the selected participant mark 248 on the course line 246, a third participant mark 254 and a fourth participant mark 256, which respectively indicate the participants with the numbers "804" and "1082" whose latest ranks are lower, are displayed at the corresponding positions. The display position of each of the selected participant mark 248, the first participant mark 250, the second participant mark 252, the third participant mark 254, and the fourth participant mark 256 is determined based on the current estimated position according to the average pace up to that point based on the remote time of the corresponding participant and is updated over time, so that each mark is displayed to be moving, moment by moment, on the course line 246. The current estimated position of each mark may be, for example, the current estimated position of each participant after the "12 km point" based on the premise that the average pace based on the remote time of the participant from the start of measurement to the "12 km point" is maintained as is. Alternatively, it may be the current estimated position of each participant after the "12 km point" based on the premise that the latest average pace, such as the average pace within the 1 km section from the "11 km point" as the previous point to the "12 km point", of the participant is maintained as is.

Figure 6:
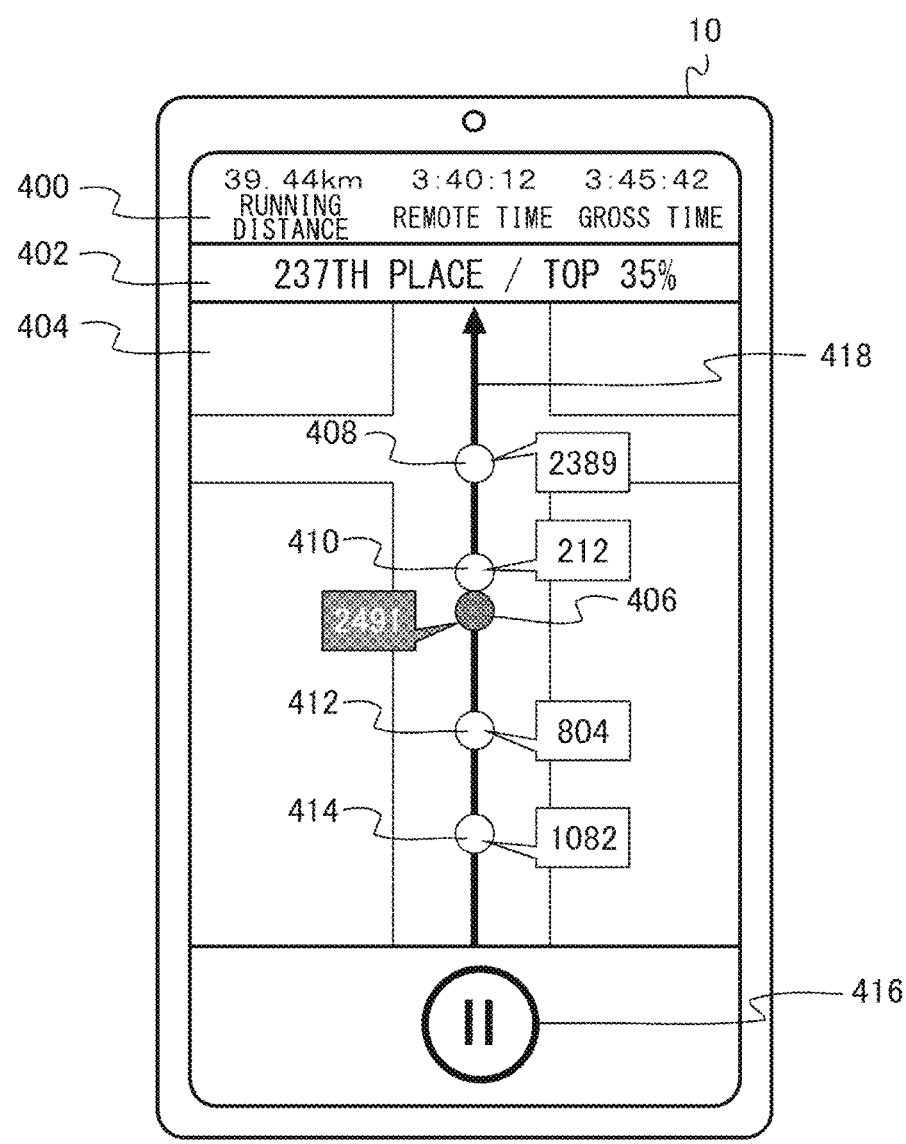
FIG. 6 is a diagram that shows an example of screen display on a user's mobile terminal in a modification.

FIG. 6 shows an example of screen display on a user's mobile terminal in a modification. In the modification of FIG. 6, the user's current location is displayed on a map that shows where the user is actually running, and virtual positions of the preceding runner and the following runner in the remote time ranking are also displayed on the map, thereby visually presenting to the user the intervals from the preceding runner and the following runner. A first column 400 shows the running distance, remote time, and gross time. The adjustment value may also be displayed. A second column 402 shows, with text, the user's current rank and the percentage from the top within which the user is positioned. A stop button 416 is a button used to order the stop of recording. A third column 404 shows a map showing the user's current location, and, on the map, a course line 418 indicating the course on which the user is currently running is displayed along the road on which the user is currently running. Also, the current locations of the user and the preceding and following runners are indicated by the respective marks on the course line 418. The map is displayed such that the running direction is always set upward on the screen, as in the so-called heading-up display. A self mark 406 is a mark indicating the user's current location. A first participant mark 408 and a second participant mark 410 are marks indicating the current locations of the preceding participants. Also, a third participant mark 412 and a fourth participant mark 414 are marks indicating the current locations of the following participants. The course line 418 indicates the trajectory along which the user has run and also the direction in which the user will run from the present; however, the user's path is not actually determined, and when and where the user will turn is undetermined. Therefore, the course line 418 ahead of the user's current location merely indicates a tentative path before the user changes the path. For example, when the user turns a corner, the map is rotated such that the road ahead of the corner is directed upward on the screen, and the course line 418 is displayed such as to indicate a tentative path set upward again. In the example of FIG. 6 described above, the user and other runners are arranged two-dimensionally on the map to visually indicate their ranks and the intervals. Alternatively, a VR (virtual reality) space may be displayed on the screen of the user's mobile terminal, for example, and a three-dimensional image of the user and other runners running in the virtual space may be displayed, thereby visually expressing their ranks and the intervals.

In another modification, a map indicating the course of a specific marathon race that actually exists and the location thereof may be displayed for a remote marathon race, as if the user is virtually running on the marathon course. Alternatively, a map indicating the course of an imaginary marathon race and the location thereof may be displayed for a remote marathon race, as if the user is virtually running on the marathon course. In yet another modification, the running distance, remote time, gross time, rank, and the like may be displayed on the screen of smart glasses. In this case, a mark or an image of a runner indicating a participant running ahead of the user in the running direction may be displayed using an AR (augmented reality) or MR (mixed reality) imaging technique, and the mark or image of the runner may be reduced and displayed on a scale according to the distance between the preceding participant and the user so that the user can grasp the distance from the preceding participant three-dimensionally.

Figure 7:
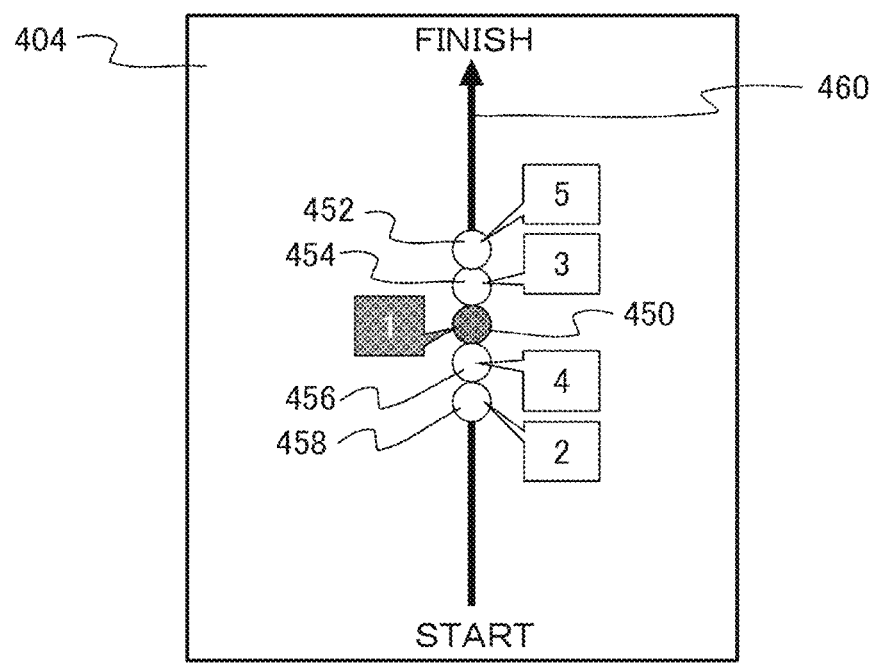
FIG. 7 is a diagram that shows a modification of current position display.

FIG. 7 shows a modification of current position display. In the example of FIG. 7, for the current position display as an alternative to the map display in the third column 404 of FIG. 6, the entire course of a remote marathon race is represented by the length of the course line 460, and where the user is running is indicated by the displayed position of a self mark 450 on the course line 460. This display is suitable to display the entire course and all participants on a single axis, when the total distance of the remote marathon race course is relatively short, such as about 10 km, or when the number of participants is relatively small, such as 3 to 10, for example. A first participant mark 452 and a second participant mark 454 are marks indicating the current locations of the preceding participants. Also, a third participant mark 456 and a fourth participant mark 458 are marks indicating the current locations of the following participants. In the example of FIG. 7, since the entire course is represented by the course line 460, the distance intervals between the user and other participants may not always be accurately grasped. However, this simpler diagram enables grasp of where the user is currently running on the course and of the order with the other participants, simultaneously.

As described above, by determining the ranking by comparing the running distance based on the adjusted time after the adjustment of the running time based on the environment information, with the running distances of other participants within the same time, and also by enabling real-time output of such adjusted ranking during the run, fairer competition can be ensured. Also, by enabling grasp of states of other participants in real time, competitiveness can be enhanced among participants who run a marathon at the same time at different locations. Also, users can voluntarily organize a small-scale marathon race easily using the run recording system 200. Also, by holding a marathon race dispersedly in multiple venues and making a correction using a common parameter for each venue based on the environment information of each venue, fairness can be ensured. For example, a distance and a time of a participant can be adjusted based on information such as the temperature at the time of start, and the altitude and atmospheric pressure at the starting point.

Second Embodiment

The second embodiment differs in that the adjustment unit 28 adjusts the running distance, as opposed to the first embodiment in which the running time is adjusted. In the following, description will be given mainly for the differences from the first embodiment, and the explanation of features in common will be omitted.

The distance measurement unit 24 judges that, in a recorded running distance, a portion from the simultaneous start time of the remote marathon race in which participation has been registered to the time limit of the race is valid and defines the running distance of the valid portion as a gross distance. Each time the gross time measured by the time measurement unit 22 advances by a predetermined time, such as 10 seconds, the running distance at the time point of 10 seconds is calculated. Accordingly, the time measurement unit 22 identifies two positioning points that sandwich a time point among the time points set every 10 seconds (hereinafter also referred to as "distance measurement points"), and the distance measurement unit 24 estimates the running distance at the distance measurement point based on the running distance and the time between the two positioning points. Also, the running time is divided into n sections of $S_1, S_2, \ldots, S_n$ in total at 10 minute intervals.

Based on multiple types of environment information acquired by the environment acquirer 12, the adjustment unit 28 adjusts the running distance measured by the distance measurement unit 24. As the distance interval between two distance measurement points, the adjustment unit 28 adjusts the running distance based on the multiple types of environment information. The adjustment unit 28 transmits, to the run recording server 100 via the communication unit information necessary for the adjustment of the running distance in the section where the user is currently running, together with an adjustment value determination request. As a response thereto, the adjustment unit 28 receives the adjustment value calculated by the run recording server 100. The adjustment unit 28 adjusts the running distance by adding the adjustment value thus received to the running distance in the section where the user is currently running. The information transmitted by the adjustment unit 28 to the run recording server 100 may be, for example, information of the running time, running distance, and environment information. As a modification, the adjustment value may be calculated by the adjustment unit 28 instead of the run recording server 100. The adjustment unit 28 acquires, from the run recording server 100, adjustment values $A_1, A_2, \ldots, A_n$ for running distances $D_1, D_2, \ldots, D_n$ in the respective sections $S_1, S_2, \ldots, S_n$. Also, when the user is running in the section $S_6$, for example, the running distance from when the running time is "0:50:00" to the current time is subject to adjustment, and, until the running time "1:00:00" elapses, the adjustment value $A_6$ is updated every 10 seconds. The current remote distance is a distance obtained by adding an accumulated adjustment value, which is obtained by accumulating the adjustment values of the respective sections up to the present, to the running distance from the simultaneous start time, which is the start date and time common to all the participants, to the current time.

The adjustment value is calculated using a function $f(e(t))$ of a learned model with an environment value $e(t)$ as a parameter. The function $f(e(t))$ may be generated as a learned model by means of regression analysis with the environment value $e(t)$ as the explanatory variable and the adjustment value of the running distance as the objective variable, based on past environment information and running data. Also, the environment information and running data accumulated in the run recording system 200 may be further reflected as a learning result in the function $f(e(t))$. The adjustment value may be a positive or negative number and is recorded, in the information storage unit 30, in association with information indicating a section to be adjusted. The adjustment value is calculated in units of distance based on the participant's environment information and is adjusted so that participants of the same ability have the same distance.

The distance measurement unit 124 calculates the adjusted running distance (remote distance) by adding the accumulated value of the adjustment values to the accumulated value of distance from the first position information to the latest position information. The comparison unit 40 transmits, to the run recording server 100 via the communication unit 50, information necessary for determination of ranking together with a ranking determination request, each time the running time in the section where the user is currently running advances by 10 seconds. In response thereto, the comparison unit 40 receives, as a comparison result, ranking information indicating the current rank determined by the run recording server 100. The information transmitted by the comparison unit 40 to the run recording server 100 may be, for example, the running time and the remote distance at the time point or may be the position information, the information on the acquisition date and time, and the running distance and the adjustment value in each time section. The ranking information is a result of comparison with other participants whose running times start at the simultaneous start time, which is the start date and time common to all the participants registered for the race with the same race ID. More specifically, the ranking information is a value indicating the current rank determined by comparing the running distance (the remote distance obtained by adding the accumulated value of the adjustment values to the gross distance) with the running distances of other participants at the same distance measurement point or in the same time section, or a value indicating percentage from the top within which the current rank is included, in the ranking among all the participants. The comparison unit 40 acquires, as the current rank, the rank at a time point that has passed most recently among the time points set every 10 seconds or the time points set every 10 minutes. For example, when the user is running in the section $S_6$, the comparison unit 40 acquires the ranking information at a time point that has passed most recently among the distance measurement points set every 10 seconds or the ranking information at the time point when the running time is "0:50:00" and transmits the ranking information to the output unit 60. Also, at intervals even shorter than the above intervals, e.g., at predetermined time intervals such as every 1 second or at predetermined distance intervals such as every 1 m, the comparison unit 40 may transmit, to the run recording server 100, information of the current running time, estimated running distance at the time point, and the adjustment value together with the ranking determination request and may acquire the real-time order in the time section where the user is currently running.

In a modification, a run recording terminal 10 may be configured to transmit, to the run recording server 100, the adjustment value determination request and the ranking determination request together as a single determination request to acquire the adjustment value and the ranking information. In this case, when the run recording terminal transmits to the run recording server 100 the running distance, the running time, and the environment information together with the determination request, the run recording server 100 determines the adjustment value of the running distance and the ranking information and transmits the adjustment value or the remote distance and the ranking information to the run recording terminal 10.

The output unit 60 outputs the running states, such as the gross time, the gross distance, the adjusted running distance (remote distance), and the current rank, in the form of an audio reading of such information. The output unit 60 also displays the running states such as the gross time, gross distance, remote distance, and current rank on the screen. The output unit 60 also displays the running states such as the gross time, gross distance, remote distance, and current rank on the screen of the user's mobile terminal.

In the state judgement unit 120 of the run recording server 100, the time measurement unit 122, distance measurement unit 124, pace measurement unit 126, and adjustment unit 128 correspond respectively to the time measurement unit 22, distance measurement unit 24, pace measurement unit 26, and adjustment unit 28 of a run recording terminal 10. The adjustment unit 128 receives, from each of multiple run recording terminals 10, the running distance and the environment information of the runner as the user in the section where the runner is currently running, together with the adjustment value determination request. Based on the environment information, the adjustment unit 128 calculates the adjustment value of the running distance and transmits, to the run recording terminal 10, the calculated adjustment value as a response to the adjustment value determination request. The adjustment unit 128 calculates the remote distance by adding the accumulated adjustment value obtained by accumulating the adjustment values of the respective sections up to the present, to the running distance from the time of start of recording to the current time and stores, in the information storage unit 130, the remote distance in association with the user ID and the running time.

The communication unit 150 is connected to the communication unit 50 of each of multiple run recording terminals 10 via the Internet and receives information of each user, such as the user ID, password, race ID, position information, acquisition date and time, running distance, running time, environment information, adjustment value determination request, remote distance, and ranking determination request. The information storage unit 130 further stores information of each user received from the corresponding run recording terminal 10, such as the position information, acquisition date and time, running distance, running time, environment information, remote distance, and start delay time.

The adjustment unit 128 receives, from each of multiple run recording terminals 10, the running distance and the environment information of the runner as the user in the section where the runner is currently running, together with the adjustment value determination request. Based on the environment information, the adjustment unit 128 calculates the adjustment value of the running distance and transmits, to the run recording terminal 10, the calculated adjustment value as a response to the adjustment value determination request. The adjustment unit 128 calculates the remote distance by adding the accumulated adjustment value obtained by accumulating the adjustment values of the respective sections up to the present, to the running distance from the simultaneous start time to the current time and stores, in the information storage unit 130, the remote distance in association with the user ID and the running time.

The comparison unit 140 corresponds to the comparison unit 40 in a run recording terminal 10 and receives, from each of multiple run recording terminals 10, the running time and the remote distance at the time point together with the ranking determination request. In response to the ranking determination request, the comparison unit 140 compares the received remote distance at the time point of the running time with the remote distances at the same time point of other participants registered to participate in the race with the same race ID. In other words, the comparison unit 140 compares the remote distances at the same time point among the runners whose running times start at the simultaneous start time common to all the participants registered for the race with the same race ID. As a result of the comparison, the comparison unit 140 determines the user's rank and transmits the rank to the run recording terminal 10. The comparison unit 140 determines a runner's rank by comparison with remote distances at the same time point, among the records of valid remote distances, i.e., remote distances run in the range from the simultaneous start time to the time limit, of other participants registered to participate in the race with the same race ID, stored in the information storage unit 130.

In order to allow viewers other than the participants to view information, such as the running distance, running time, remote distance, and rank of each participant, the output unit 144 transmits information on each participant to the viewer terminal 152 via the communication unit 50 in response to a viewing request. The information on each participant includes information identifying the participant and a list of the running time, running distance and remote distance, adjustment value, and rank in each section of the participant, for example.

The second embodiment describes an example in which the measurement of the running time and running distance and the correction of the position information are performed on the side of the state judgement unit 20 in a run recording terminal 10. In a modification, part or all of the processes performed by the state judgement unit 20 may be performed on the side of the state judgement unit 120 in the run recording server 100, and the result may be sent back to the run recording terminal 10. In this case, the run recording terminal 10 transmits the position information and information on the acquisition date and time thereof to the run recording server 100 via the communication unit 50, and the state judgement unit 120 receives such information via the communication unit 150. The time measurement unit 122 and the distance measurement unit 124 then calculate the running time and the running distance and transmit the running time and running distance to the run recording terminal 10 via the communication unit 150. In another modification, the adjustment value of the running distance may be calculated on the run recording terminal 10 side, and the adjustment value or remote distance information may be transmitted from the run recording terminal 10 to the run recording server 100.

Figure 8:
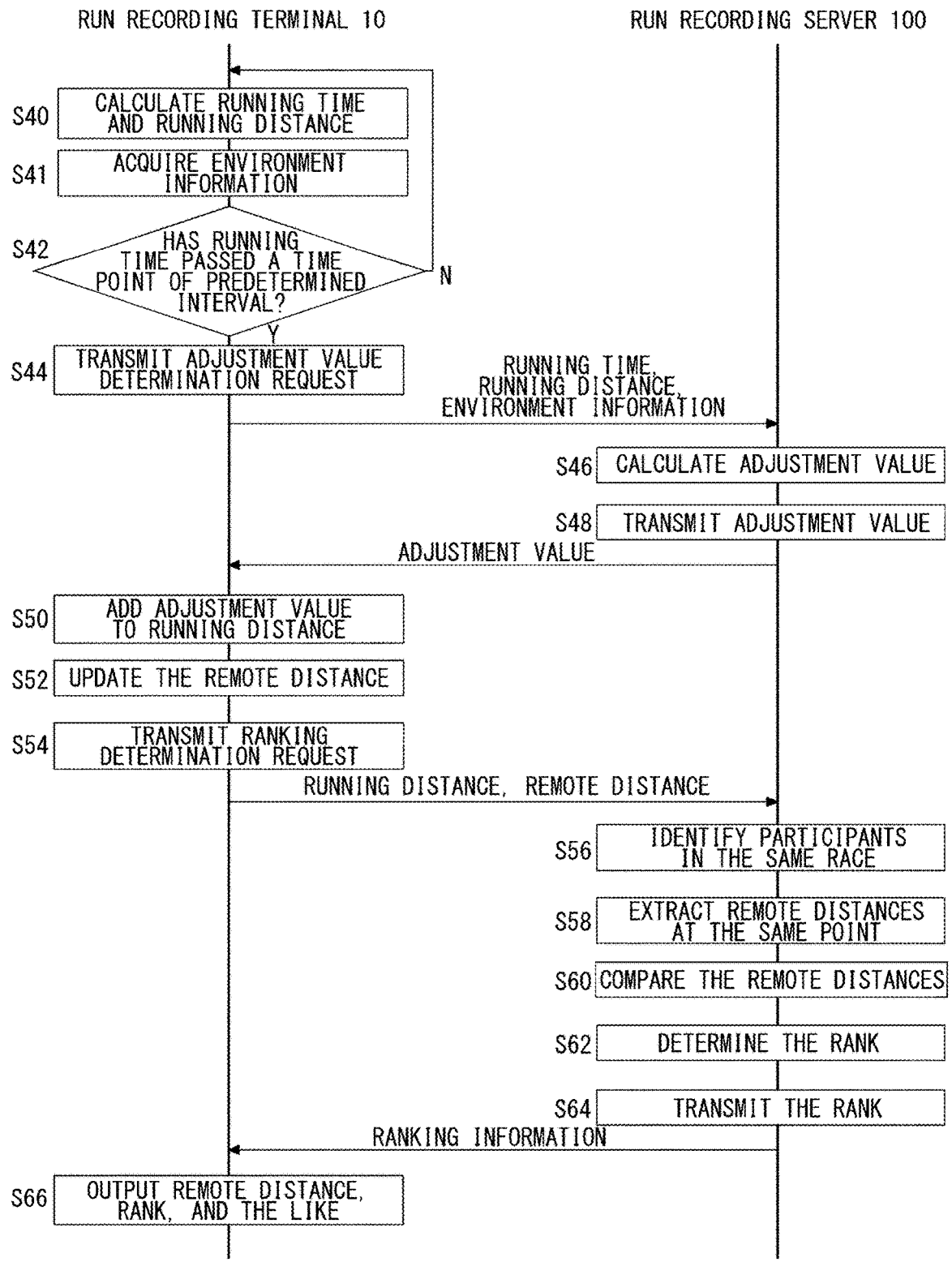
FIG. 8 is a flowchart that shows a process of transmitting and receiving information performed between a run recording terminal and the run recording server, adjusting a running time, and determining ranking.

FIG. 8 is a flowchart that shows a process of transmitting and receiving information performed between a run recording terminal 10 and the run recording server 100, adjusting a running time, and determining ranking. In a run recording terminal 10 of a user who is running a remote marathon race, the time measurement unit 22 and the distance measurement unit 24 calculate the running time and the running distance based on the position information and the acquisition time thereof (S40), the environment acquirer 12 acquires the environment information (S41), and the process of S40 and S41 is repeated until the running time passes one of time points set at predetermined intervals, such as every 10 seconds (N at S42). When the running time passes one of time points set every 10 seconds (Y at S42), the run recording terminal 10 transmits, to the run recording server 100, the running time, running distance, and environment information, as the adjustment value determination request (S44). In the run recording server 100 that has received the adjustment value determination request, the adjustment unit 128 calculates the adjustment value of the running distance based on the received running time, running distance, and environment information (S46) and transmits, to the run recording terminal 10, the calculated adjustment value as a response to the adjustment value determination request (S48). In the run recording terminal 10 that has received the adjustment value, the adjustment unit 28 adds the received adjustment value to the running distance (S50) and updates the remote distance (S52).

The comparison unit 40 of the run recording terminal 10 transmits the running distance and the remote distance as the ranking determination request to the run recording server 100 (S54); in the run recording server 100 that has received the ranking determination request, the comparison unit 140 identifies other participants registered for the race with the same race ID in the information storage unit 130 (S56). The comparison unit 140 extracts, from the data of the identified other participants, remote distances at the same time point as indicated in the ranking determination request (S58) and compares the remote distance indicated in the ranking determination request and the remote distances of other participants (S60) to determine the rank of the user, who is the sender of the ranking determination request (S62). The comparison unit 140 then transmits, to the run recording terminal 10, the ranking information as a response to the ranking determination request (S64). The run recording terminal 10 that has received the ranking information outputs the running time, remote distance, rank, and the like in the form of screen display or sound, for example (S66). The process flow described above is repeated until the termination of the recording.

Figure 9:
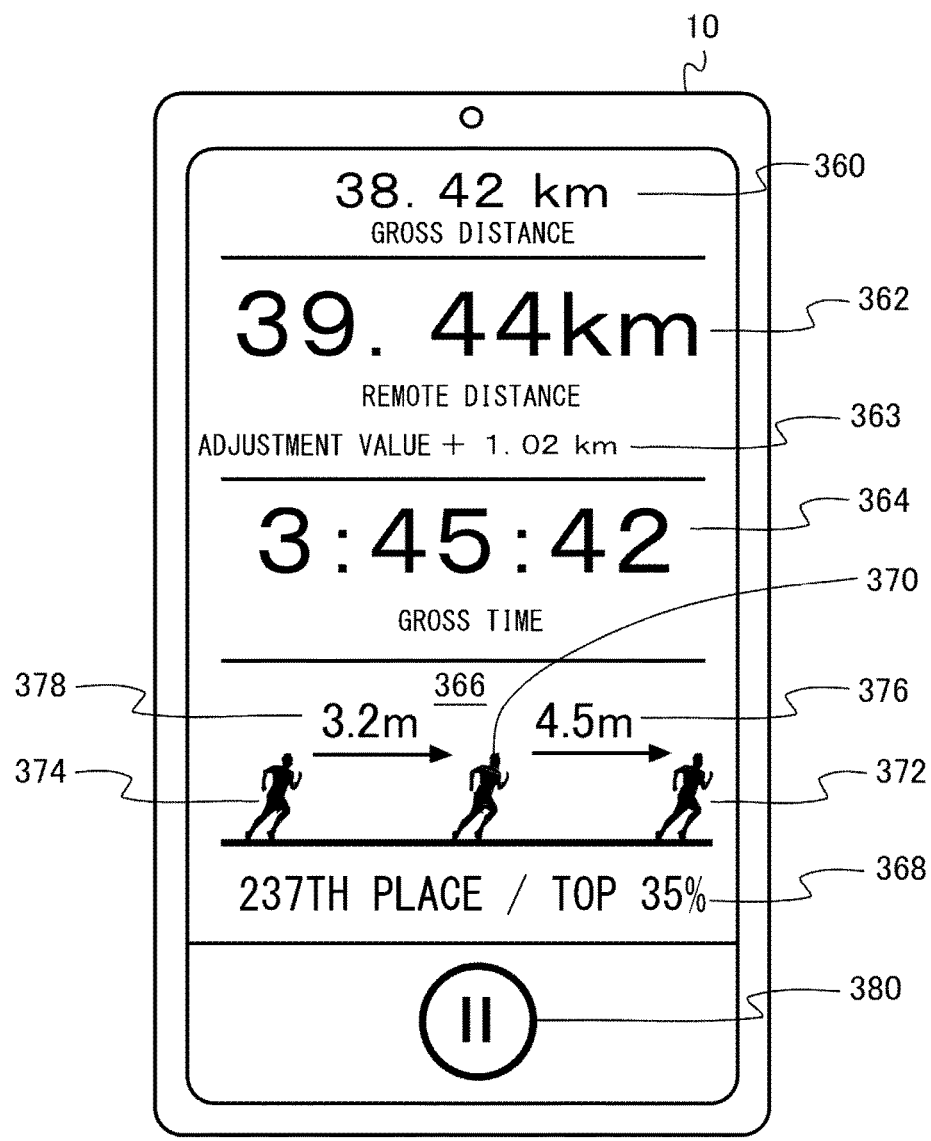
FIG. 9 is a diagram that shows an example of screen display on a user's mobile terminal.

FIG. 9 shows an example of screen display on a user's mobile terminal. A running distance 360 shows the running distance (gross distance) as an actual measured value. A remote distance 362 shows the running distance after adjustment (remote distance). An adjustment value 363 shows the accumulated value of the adjustment values to be added to the gross distance. A running time 364 shows the gross time. A situation image 366 shows an animation displaying the positional relationship between the user himself or herself and the preceding and following runners. In the situation image 366, a self icon 370 represents the user himself or herself and is always displayed in the center. With the running direction set toward the right side of the screen, a preceding runner icon 372, which indicates the position of the preceding runner, is displayed on the right side, and a following runner icon 374, which indicates the position of the following runner, is displayed on the left side, at the positions corresponding to the respective distance differences from the user. A preceding distance 376 shows, with text, the distance difference from the preceding runner. Also, a following distance 378 shows with text the distance difference from the following runner. In a modification, the intervals from the preceding runner and the following runner may be shown as time differences. Rank display 368 shows, with text, the user's current rank and the percentage from the top within which the user is positioned. A stop button 380 is a button used to order the stop of recording.

The rank displayed in the rank display 368 and the distance differences from the preceding runner and the following runner displayed with the icons are those in the time section that has elapsed most recently. In a modification, the remote distance at the current time, which is obtained by adding, to the remote distance up to the time section that has elapsed most recently, the running distance from the elapse of the time section to the current time and the adjustment value thereof, may be compared with the remote distances of other participants at the same time point among the time points set every 10 seconds, and the rank obtained thereby may be displayed.

Figure 10:
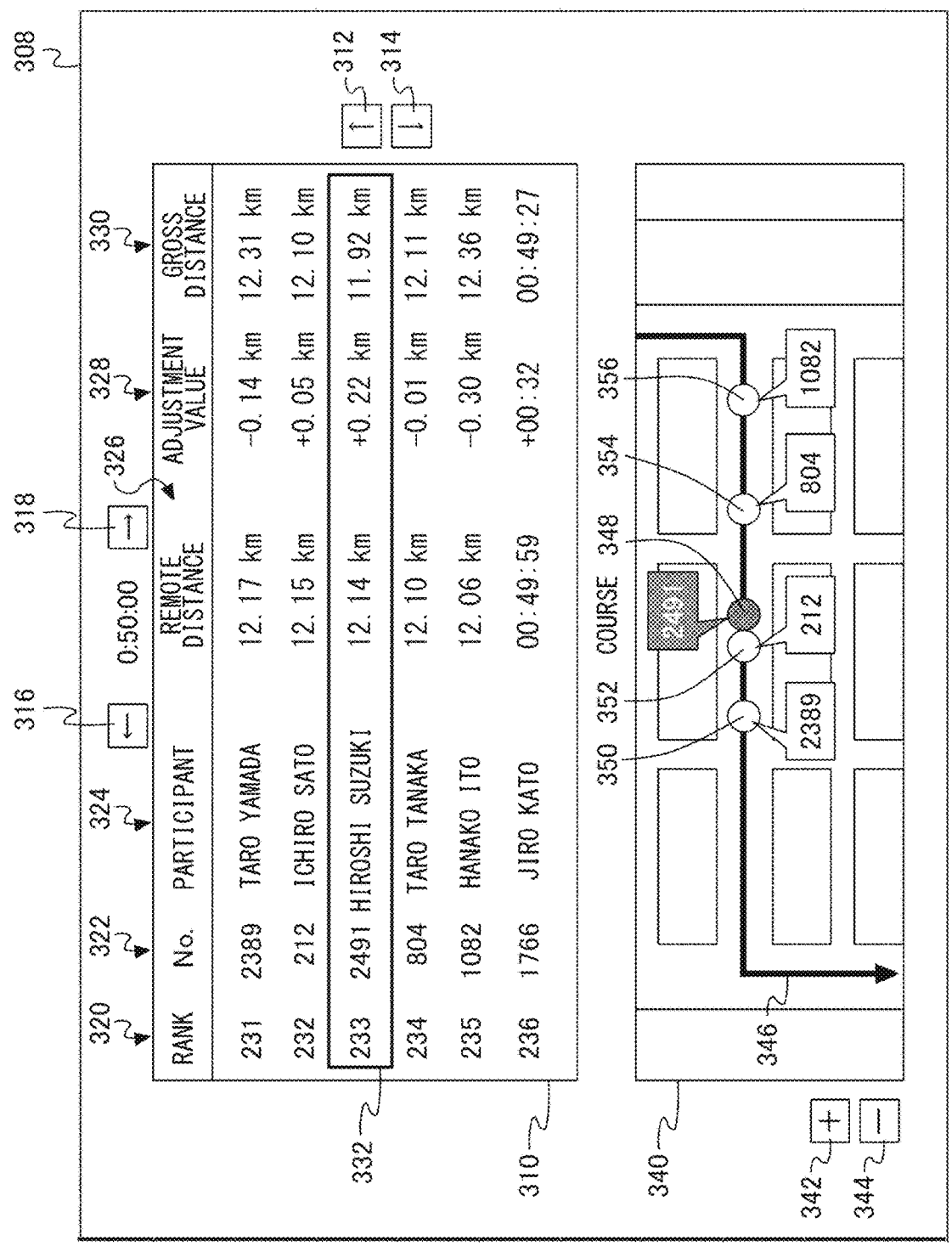
FIG. 10 is a diagram that shows an example of screen display displaying the rank of each participant in a remote marathon race in a second embodiment.

FIG. 10 shows an example of screen display displaying the rank of each participant in a remote marathon race in the second embodiment. A screen 308 is a screen of the viewer terminal 152 prepared mainly for viewing by persons other than the participants and is displayed, for example, on a personal computer or tablet terminal using a web browser. The screen 308 includes a ranking table 310 and a map column 340. The ranking table 310 shows a list of participants in the remote marathon race in order of longest remote distance when a predetermined running time has elapsed or at a predetermined time. A first column 320 shows the rank of each participant, a second column 322 shows the number of each participant, and a third column 324 shows the name of each participant. Also, a fourth column 326 shows the remote distance of each participant, a fifth column 328 shows the adjustment value of each participant, and a sixth column 330 shows the gross distance of each participant. In the example of FIG. 10, seven participants are displayed, from the "231st" to "236th" places in the ranking based on the remote distance when the running time is "0:50:00". To the right of the ranking table 310, an upward scroll button 312 and a downward scroll button 314 are displayed; when a viewer presses the upward scroll button 312, the list is switched to a list of higher-ranked participants, and, when a viewer presses the downward scroll button 314, the list is switched to a list of lower-ranked participants. Above the ranking table 310, a left move button 316 and a right move button 318 are displayed; when a viewer presses the left move button 316, the list display is switched to that at the previous running time (such as 10 minutes before), i.e., when the running time is "0:40:00", and, when a viewer presses the right move button 318, the list display is switched to that at the next running time (such as 10 minutes after), i.e., when the running time is "1:00:00".

For example, for a participant named "Hiroshi Suzuki", whose rank is "233rd" place and whose number is "2491", the distance "12.14 km" is displayed as the remote distance when the running time is "0:50:00". This remote distance is a distance obtained by adding the adjustment value of "0.22 km" to the gross distance of "11.92 km". Similarly, also for the participant named "Ichiro Sato", whose rank is "232nd" place and whose number is "212", and the participant named "Jiro Kato", whose rank is "236th" place and whose number is "1766", a positive adjustment value is added to each of their gross distances. This means that, since these participants ran in relatively uncomfortable environments, positive adjustment values are added so that their running distances are adjusted to be longer by that much. On the other hand, for the participant named "Taro Yamada", whose rank is "231st" place and whose number is "2389", the participant named "Taro Tanaka", whose rank is "234th" place and whose number is "804", and the participant named "Hanako Ito", whose rank is "235th" place and whose number is "1082", a negative adjustment value is added to each of their gross distances. This means that, since these participants ran in relatively comfortable environments, negative adjustment values are added so that their running times are adjusted to be shorter by that much. Thus, by adjusting, with the adjustment value, the difference in the running environment for each of participants who are running with the same simultaneous start time set to the starting point in the same race, the fairness of the ranking can be improved. When a viewer has selected a participant from the list of participants, the row of the selected participant is enclosed by a bold selection frame 332 and highlighted. Also, the current positions of the selected participant and the preceding and following participants are displayed in the map column 340.

The map column 340 shows a map of a marathon course virtually set. To the left of the map column 340, an enlarge button 342 and a reduce button 344 are displayed. When the enlarge button 342 is pressed, the map displayed in the map column 340 is enlarged, and, when the reduce button 344 is pressed, the map displayed in the map column 340 is reduced. A course line 346 indicates the marathon course set on the displayed map. A selected participant mark 348, which indicates the participant with the number "2491" selectively displayed with the selection frame 332, is displayed at a predetermined position on the course line 346 such as to be positioned approximately near the center of the map column 340. Ahead of the selected participant mark 348 on the course line 346, a first participant mark 350 and a second participant mark 352, which respectively indicate the participants with the numbers "2389" and "212" whose latest ranks are higher, are displayed at the corresponding positions. Also, behind the selected participant mark 348 on the course line 346, a third participant mark 354 and a fourth participant mark 356, which respectively indicate the participants with the numbers "804" and "1082" whose latest ranks are lower, are displayed at the corresponding positions. The display position of each of the selected participant mark 348, the first participant mark 350, the second participant mark 352, the third participant mark 354, and the fourth participant mark 356 is determined based on the current estimated position according to the average pace up to that point based on the remote distance of the corresponding participant and is updated over time, so that each mark is displayed to be moving, moment by moment, on the course line 346. The current estimated position of each mark may be, for example, the current estimated position of each participant after "0:50:00" based on the premise that the average pace based on the elapsed time and the remote distance of the participant from the start of measurement to "0:50:00" is maintained as is. Alternatively, it may be the current estimated position of each participant after "0:50:00" based on the premise that the latest average pace, such as the average pace from "0:40:00" as the previous running time to "0:50:00", of the participant is maintained as is.

Figure 11:
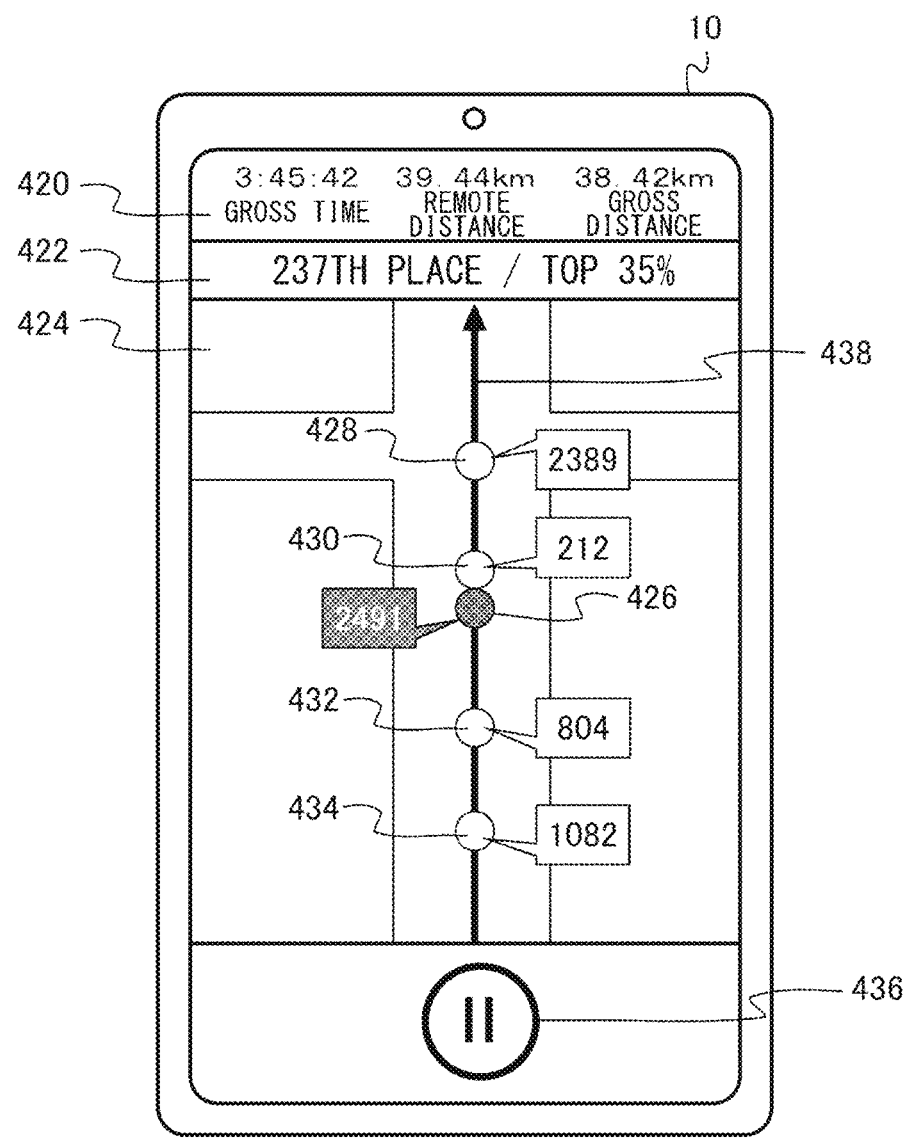
FIG. 11 is a diagram that shows an example of screen display on a user's mobile terminal in a modification.

FIG. 11 shows an example of screen display on a user's mobile terminal in a modification. In the modification of FIG. 11, the user's current location is displayed on a map that shows where the user is actually running, and virtual positions of the preceding runner and the following runner in the remote distance ranking are also displayed on the map, thereby visually presenting to the user the intervals from the preceding runner and the following runner. A first column 420 shows the gross time, remote distance, and gross distance. The adjustment value may also be displayed. A second column 422 shows, with text, the user's current rank and the percentage from the top within which the user is positioned. A stop button 436 is a button used to order the stop of recording. A third column 424 shows a map showing the user's current location, and, on the map, a course line 438 indicating the course on which the user is currently running is displayed along the road on which the user is currently running. Also, the current locations of the user and the preceding and following runners are indicated by the respective marks on the course line 438. The map is displayed such that the running direction is always set upward on the screen, as in the so-called heading-up display. A self mark 426 is a mark indicating the user's current location. A first participant mark 428 and a second participant mark 430 are marks indicating the current locations of the preceding participants. Also, a third participant mark 432 and a fourth participant mark 434 are marks indicating the current locations of the following participants.

As described above, by determining the ranking by comparing the running distance adjusted based on the environment information with the adjusted running distances of other participants, and also by enabling real-time output of such adjusted ranking during the run, fairer competition can be ensured.

Third Embodiment

The third embodiment differs in that the comparison unit 40 and the comparison unit 140 determine the ranking within a category classified by differences in the environment information, as opposed to the first and second embodiments in which the ranking among all participants is determined. In the following, description will be given mainly for the differences from the first and second embodiments, and the explanation of features in common will be omitted.

The comparison unit 40 and the comparison unit 140 judge which of multiple categories the user falls into based on the environment information to relate the user to the category and compare the running distance with the running distances of other participants in the same category to determine the ranking. For example, categories may be divided based on altitude information, atmospheric pressure information, temperature information, and the like. The "category A" has the highest degree of load and corresponds, for example, to the case where the altitude exceeds 1500 m, the case where the atmospheric pressure is 850 hPa or lower, and the case where the air temperature exceeds 25 degrees C. The "category B" has the next highest degree of load and corresponds, for example, to the case where the altitude is between 1000 and 1500 m, the case where the atmospheric pressure is between 850 and 900 hPa, and the case where the air temperature is between 15 and 25 degrees C. The "category C" has a relatively low degree of load and corresponds, for example, to the case where the altitude is lower than 1000 m, the case where the atmospheric pressure is 900 hPa or higher, and the case where the air temperature is lower than 15 degrees C.

When the categories are divided based on the environment information as described above, the running time or running distance need not be adjusted by the adjustment unit 28, and, even in that case, differences in the load due to differences in the environment information can be generally absorbed by the categories, so that the fairness can be ensured.

The present invention has been described with reference to embodiments. The embodiments are intended to be illustrative only, and it will be obvious to those skilled in the art that various modifications to a combination of constituting elements or processes could be developed and that such modifications also fall within the scope of the present invention.

What is claimed is:

1. A run recording server, comprising:
a processor configured to function as:
a position acquirer that acquires, from a first run recording terminal of a first runner, first position information of the first runner running at a starting time of running a running event and acquires, from a second run recording terminal of a second runner, second position information of a second runner running at the starting time of running the running event;
an environment acquirer that periodically acquires during the running event, from the first run recording terminal, first environment information indicating a first running environment of the first runner and acquires, from the second run recording terminal, second environment information indicating a second running environment of the second runner, the first environment information and the second environment information including at least one of an altitude at which a runner is running the running event, a surface condition of a surface on which the runner is running the running event, and an inclination of the surface on which the runner is running the running event;
an adjustment unit that adjusts a first running time of the first runner running the running event based on the first environment information and a second running time of the second runner running the running event based on the second environment information to correct a difference in running load due to running environment differences between the first runner and the second runner running in the running event; and
a comparison unit that:
classifies a first running load of the first runner based on the first environment information and a second running load of the second runner based on the second environment information,
ranks the first runner and the second runner based on the first running time and the second running time that are not adjusted by the adjustment unit in response to classifying the first running load and the second running load into a same classification category having a degree of running load, and
ranks the first runner and the second runner based on the first running time and the second running time that are adjusted by the adjustment unit in response to classifying the first running load and the second running load into different classification categories having different degrees of running load.

2. The run recording server according to claim 1, wherein the processor is configured to further function as an output unit that outputs running information based on the first running time and the second running time adjusted by the adjustment unit.

3. The run recording server according to claim 2, wherein the running information includes a running time starting at the starting time for completing the running event.

4. The run recording server according to claim 2, wherein the running information includes a running distance.

5. A run recording system, comprising:
a run recording terminal, comprising:
a processor configured to function as:
a position acquirer that acquires position information of a runner running at a starting time of running a running event; and
an environment acquirer that periodically acquires during the running event environment information indicating running environment of the runner, the environment information including at least one of an altitude at which the runner is running the running event, a surface condition of a surface on which the runner is running the running event, and an inclination of the surface on which the runner is running the running event; and
a run recording server comprising:
an adjustment unit that adjusts a running time of the runner running the running event based on the environment information to correct a difference in running load due to running environment differences that may occur between the runner and another runner running in the running event; and a comparison unit that:
  classifies a first running load of a first runner based on first running environment information indicating a first running environment of the first runner and a second running load of a second user based on second environment information indicating a second running environment of the second runner,
  ranks the first runner and the second runner based on a first running time of the first runner and a second running time of the second runner that are not adjusted by the adjustment unit in response to classifying the first running load and the second running load into a same classification category having a degree of running load, and
  ranks the first runner and the second runner based on the first running time and the second running time that are adjusted by the adjustment unit in response to classifying the first running load and the second running load into different classification categories having different degrees of running load.

6. A run recording server, comprising:
a processor configured to function as:
  a position acquirer that acquires, from a run recording terminal of a runner, position information of the runner running at a starting time of running a running event;
  an environment acquirer that periodically acquires during the running event, from the run recording terminal, environment information indicating a running environment of the runner, the environment information including at least one of an altitude at which the runner is running the running event, a surface condition of a surface on which the runner is running the running event, and an inclination of the surface on which the runner is running the running event;
  an adjustment unit that adjusts a running time of the runner running the running event based on the environment information to correct a difference in running load due to running environment differences between the runner and another runner running in the running event; and
  a comparison unit that:
    classifies a first running load of a first runner based on first running environment information indicating a first running environment of the first runner and a second running load of a second user based on second environment information indicating a second running environment of the second runner,
    ranks the first runner and the second runner based on a first running time of the first runner and a second running time of the second runner that are not adjusted by the adjustment unit in response to classifying the first running load and the second running load into a same classification category having a degree of running load, and
    ranks the first runner and the second runner based on the first running time and the second running time that are adjusted by the adjustment unit in response to classifying the first running load and the second running load into different classification categories having different degrees of running load.

7. A run recording method of a run recording server, the run recording method comprising:
  acquiring, from a first run recording terminal of a first runner, first position information of the first runner running at a starting time of running a running event and second position information of a second runner running at the starting time of running the running event;
  periodically acquiring during the running event, from the first run recording terminal, first environment information indicating a first running environment of the first runner and second environment information indicating a second running environment of the second runner, the first environment information and the second environment information including at least one of an altitude at which a runner is running the running event, a surface condition of a surface on which the runner is running the running event, and an inclination of the surface on which the runner is running the running event;
  adjusting a first running time of the first runner running the running event based on the first environment information and a second running time of the second runner running the running event based on the second environment information to correct a difference in running load due to running environment differences between the first runner and the second runner running in the running event;
  classifying a first running load of the first runner based on the first environment information and a second running load of the second runner based on the second environment information;
  ranking the first runner and the second runner based on the first running time and the second running time that are not adjusted in response to classifying the first running load and the second running load into a same classification category having a degree of running load; and
  ranking the first runner and the second runner based on the first running time and the second running time that are adjusted in response to classifying the first running load and the second running load into different classification categories having different degrees of running load.

8. The run recording server of claim 1, wherein the first run recording terminal includes a mobile terminal, a smartphone, or a smartwatch of the first runner, and the second run recording terminal includes a mobile terminal, a smartphone, or a smartwatch of the second runner.

9. The run recording server of claim 8, wherein the surface condition includes at least one of a road, an athletic track, and a treadmill as the surface on which the runner is running the running event.

10. The run recording server of claim 9, wherein the surface condition includes at least one of a paved road and an unpaved road as the road on which the runner is running the running event.

11. The run recording server of claim 9, wherein the first environment information and the second environment information includes at least one of a temperature of an environment in which the runner is running the running event, a humidity of the environment in which the runner is running the running event, a wind speed of the environment in which the runner is running the running event, a wind direction of the environment in which the runner is running the running event, and an atmospheric pressure of the environment in which the runner is running the running event.

12. The run recording server of claim 9, wherein the adjustment unit adjusts the first running time and the second running time using a function $f(e(t))$ of a learned model with the first environment information and the second environment information as a parameter $e(t)$, the function being learned by means of regression analysis with the parameter $e(t)$ as an explanatory variable and an adjustment value of the first running time and the second running time as an objective variable to correct the difference in the running load due to the running environment differences between the first runner and the second runner running in the running event.

* * * * *